(12) United States Patent
Crandall et al.

(10) Patent No.: US 7,428,324 B2
(45) Date of Patent: Sep. 23, 2008

(54) SYSTEM AND METHOD FOR DATA MANAGEMENT IN A LINEAR-ARRAY-BASED MICROSCOPE SLIDE SCANNER

(75) Inventors: Greg J. Crandall, Rancho Santa Fe, CA (US); Ole Eichhorn, Westlake Village, CA (US); Allen H. Olson, San Diego, CA (US); Dirk G. Soenksen, Carlsbad, CA (US)

(73) Assignee: Aperio Technologies, Inc., Vista, CA (US)

( * ) Notice: Subject to any disclaimer, the term of this patent is extended or adjusted under 35 U.S.C. 154(b) by 278 days.

(21) Appl. No.: 11/379,648

(22) Filed: Apr. 21, 2006

(65) Prior Publication Data

US 2007/0036462 A1 Feb. 15, 2007

Related U.S. Application Data

(63) Continuation of application No. 10/371,586, filed on Feb. 21, 2003, now Pat. No. 7,035,478, which is a continuation-in-part of application No. 09/563,437, filed on May 3, 2000, now Pat. No. 6,711,283.

(51) Int. Cl.
*G06K 9/00* (2006.01)
(52) U.S. Cl. ..................................... 382/128
(58) Field of Classification Search ................ 382/128, 382/294
See application file for complete search history.

(56) References Cited

U.S. PATENT DOCUMENTS

| | | |
|---|---|---|
| 3,643,015 A | 2/1972 | Davidovits et al. |
| 4,673,988 A | 6/1987 | Jansson et al. |
| 4,700,298 A | 10/1987 | Palcic et al. |

(Continued)

FOREIGN PATENT DOCUMENTS

| | | |
|---|---|---|
| EP | 0 339 582 | 4/1989 |
| EP | 0 871 052 | 10/1998 |
| WO | 98/39728 | 9/1998 |
| WO | 98/44446 | 10/1998 |

OTHER PUBLICATIONS

Hamilton, Eric, "JPEG File Interchange Format" Version 1.02, Sep. 1, 1992; C-Cube Microsystem, Milpitas, CA.
Adobe Developers Association, "TIFF" Revision 6.0, Jun. 3, 1992; Adobe Systems Incorporated, Mountain View, CA.

*Primary Examiner*—Tom Y Lu
(74) *Attorney, Agent, or Firm*—Pattric J. Rawlins; Procopio Cory Hargreaves & Savitch LLP

(57) ABSTRACT

A data management system and method for processing, storing, and viewing the extremely large imagery data that is rapidly produced by a linear-array-based microscope slide scanner is provided. The system receives, processes, and stores imagery data produced by the linear-array-based microscope slide scanner at approximately 3 GB per minute. The data are received as a series of overlapping image stripes and combined into a seamless and contiguous baseline image. The baseline image is logically mapped into a plurality of regions that are individually addressed to facilitate viewing and manipulation of the baseline image. The data management system enables imagery data compression while scanning and capturing new image stripes. This advantageously eliminates the overhead associated with storing uncompressed image stripes. The image compression also creates intermediate level images, thereby organizing the baseline image into a variable level pyramid structure referred to as a virtual slide. The data management system efficiently converts image stripes into a high quality virtual slide that allows rapid panning and zooming by image viewing software in accordance with the individually addressed regions. The virtual slide also allows efficient processing by an algorithm framework. The data management system is costs effective and saleable, employs standard image file formats and supports the use of virtual slides in desirable applications such as telemedicine, telepath logy, microscopy education, and the analysis of high value specimens such as tissue arrays.

13 Claims, 20 Drawing Sheets

U.S. PATENT DOCUMENTS

| | | | |
|---|---|---|---|
| 4,742,558 A | 5/1988 | Ishibashi et al. | |
| 4,744,642 A | 5/1988 | Yoshinaga et al. | |
| 4,760,385 A | 7/1988 | Jansson et al. | |
| 4,777,525 A | 10/1988 | Preston et al. | |
| 4,845,552 A | 7/1989 | Jaggi et al. | |
| 4,960,999 A | 10/1990 | McKean et al. | |
| 5,086,477 A | 2/1992 | Yu et al. | |
| 5,187,754 A | 2/1993 | Currin et al. | |
| 5,231,663 A | 7/1993 | Earl et al. | |
| 5,400,145 A | 3/1995 | Suita et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,668,887 A * | 9/1997 | Parker et al. | 382/108 |
| 5,672,861 A | 9/1997 | Fairley et al. | |
| 5,710,835 A | 1/1998 | Bradley | |
| 5,714,756 A | 2/1998 | Park et al. | |
| 5,793,969 A | 8/1998 | Kamentsky et al. | |
| 5,796,861 A | 8/1998 | Vogt | |
| 5,834,758 A | 11/1998 | Trulson et al. | |
| 5,872,591 A | 2/1999 | Truc et al. | |
| 5,912,699 A | 6/1999 | Hayenga et al. | |
| 5,922,282 A | 7/1999 | Ledley | |
| 5,932,872 A * | 8/1999 | Price | 250/201.3 |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,078,681 A | 6/2000 | Silver | |
| 6,091,846 A * | 7/2000 | Lin et al. | 382/145 |
| 6,101,265 A | 8/2000 | Bacus et al. | |
| 6,272,235 B1 | 8/2001 | Bacus et al. | |
| 6,327,377 B1 | 12/2001 | Rutenberg et al. | |
| 6,330,348 B1 | 12/2001 | Kerschmann et al. | |
| 6,438,268 B1 | 8/2002 | Cockshott et al. | |
| 6,496,256 B1 * | 12/2002 | Eytan et al. | 356/237.5 |
| 6,519,357 B2 | 2/2003 | Takeuchi | |
| 6,545,265 B1 * | 4/2003 | Czarnetzki et al. | 250/234 |
| 6,711,283 B1 | 3/2004 | Soenksen | |

\* cited by examiner

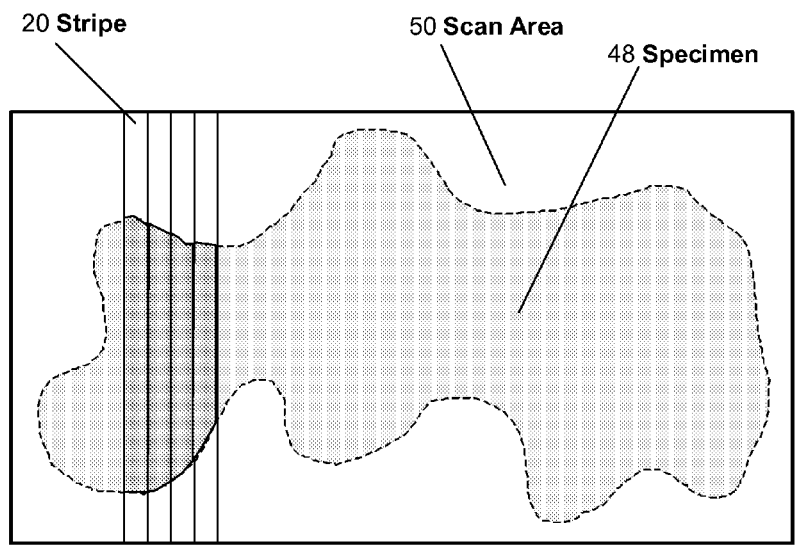
FIG. 6
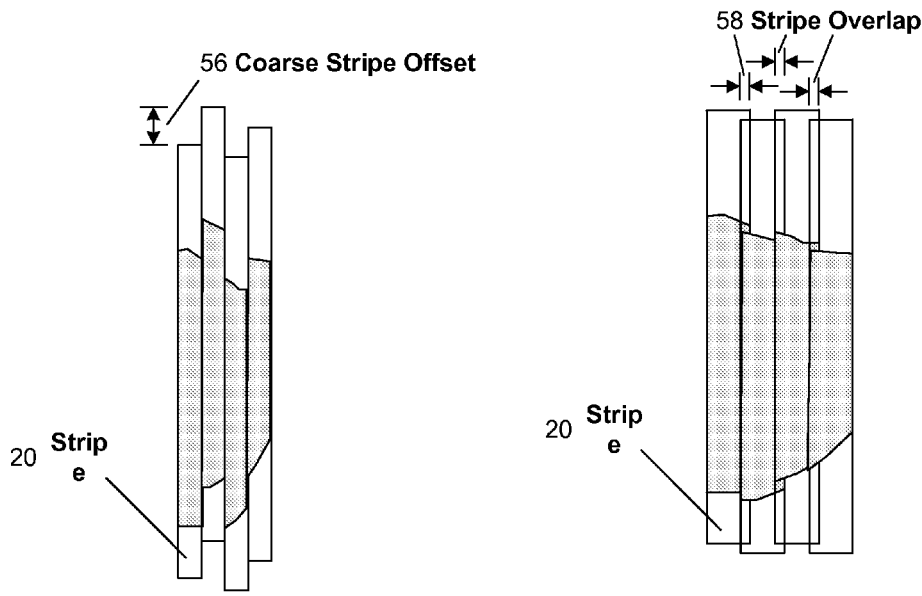
FIG. 7A
FIG. 7B

112 Illumination correction table

| Row No. | Red | Green | Blue |
|---|---|---|---|
| 1 | 1.1 | 1.1 | 1.1 |
| 2 | 1.2 | 1.2 | 1.2 |
| 3 | 1.3 | 1.3 | 1.3 |
| ⋮ | ⋮ | ⋮ | ⋮ |
| 2,048 | 1.1 | 1.1 | 1.1 |

FIG. 12

| | | |
|---|---|---|
| Stripe_1.tif | 0 | 0 |
| Stripe_2.tif | -8 | 1992 |
| Stripe_3.tif | -13 | 3985 |
| Stripe_4.tif | -21 | 5982 |
| Stripe_5.tif | -22 | 7976 |
| Stripe_6.tif | -25 | 9956 |
| Stripe_7.tif | -25 | 11950 |

FIG. 16

SYSTEM AND METHOD FOR DATA MANAGEMENT IN A LINEAR-ARRAY-BASED MICROSCOPE SLIDE SCANNER

RELATED APPLICATION

The present application is a continuation application Ser. No. 10/371,586, filed Feb. 21, 2003, now U.S. Pat. No. 7,035,478 which is a continuation-in-part of application Ser. No. 09/563,437, filed May 3, 2000, now U.S. Pat. No. 6,711,283, which is incorporated herein by reference in its entirety.

BACKGROUND

1. Field of the Invention

The present invention relates generally to the field of virtual microscopy and pertains more specifically to data management for very large digital imaging files captured by a high resolution linear-array-based microscope slide scanner.

2. Related Art

Conventional scanners typically digitize a region of a physical specimen at a desired resolution. As the desired resolution increases, the scanning process becomes more technically challenging. Similarly, the scanning process becomes more challenging as the region of interest increases or as the available scanning time decreases. Furthermore, the efficiency with which the digitized data can be viewed on a monitor is often critical to the overall utility of conventional scanning applications.

Recent technical advances in conventional sensors, computers, storage capacity, and image management have made it possible to digitize an entire microscope slide at diagnostic resolution, which is particularly desirable. Diagnostic resolution is the resolution required for a trained technician or clinician to make a diagnosis directly from a computer monitor, rather than making a diagnosis by looking through the eyepieces of a conventional microscope. Diagnostic resolution varies by sample type, for example, the diagnostic resolution required for a skin biopsy specimen is typically lower (i.e., diagnosis requires a lower resolution) than the diagnostic resolution required for other types of biopsy specimens.

Although now technically possible, digitizing an entire microscope slide at a diagnostic resolution remains a formidable challenge. Any practical solution must capture immense amounts of high quality imagery data in a relatively short amount of time. FIG. 1 is a graph diagram plotting the limiting resolution in micrometers ("µm") of an optical system with realistic condenser settings versus the numerical aperture ("NA") for the optical system's microscope objective lens. The limiting resolution is defined as the smallest distance that can be resolved by the optical system. For example, in an optical system that is designed and manufactured appropriately, the limiting resolution would be the minimum spatial dimension that can be observed by the human eye.

As shown in the graph, the limiting resolution for an objective lens with a 0.3 NA is approximately 1.5 µm. Moreover, the limiting resolution for an objective lens with a 0.4 NA improves to about 1 µm while the limiting resolution for an objective lens with a 0.8 NA improves to an even better 0.5 µm. At this juncture, it is important to note that the limiting resolution is independent of magnification and depends solely on the numerical aperture of the objective lens.

Conventional systems that digitize a microscope specimen without losing any details available to the human eye require the dimension of a detector element to be no larger than one half the corresponding limiting resolution distance. This 2-pixel requirement is based on the well-known Nyquist sampling theorem. It should be clear that for a 2-dimensional imaging system, the 2-pixel requirement translates into an array of 2 pixels by 2 pixels. Stated differently, if the limiting resolution is 1 µm, then it is necessary to digitize the specimen at 0.5 µm per pixel (or better) to capture all of the information that is available to the human eye through the objective lens.

FIG. 2 is a graph diagram plotting the scanning resolution in pixels per inch ("ppi") versus the numerical aperture of an objective lens. As shown in the graph, an objective lens with a 0.3 NA requires a scanning resolution of at least 38,000 ppi. This resolution is required to capture all of the details provided by the 0.03 NA objective lens and viewable by the human eye. Similarly, an objective lens with a 0.4 NA requires a scanning resolution of at least 50,000 ppi while an objective lens with a 0.8 NA requires a scanning resolution of at least 100,000 ppi.

FIG. 3 is a graph diagram plotting the scanning resolution in pixels per inch versus the resulting uncompressed file size in megabytes ("MB") for a one square millimeter ("mm") region. The graph pertains to regions captured as 24-bit pixels (3 color channels, 8-bits per channel). As illustrated, a 1 $mm^2$ region at 38,000 ppi is approximately 8 MB (as captured by an objective lens with a 0.03 NA according to FIG. 2). Similarly, a higher scanning resolution of 50,000 ppi for the same 1 $mm^2$ region would result in a file size of 11 MB while a scanning resolution of 100,000 ppi would result in a file size of approximately 47 MB. As can be seen, the size of the image file increases dramatically as the required scanning resolution, expressed in pixels per inch, increases in relation to the increasing numerical aperture of the objective lens. Thus, as the scanning resolution increases, the image file size increases significantly.

Accordingly, digitizing an entire microscope slide at a diagnostic resolution results in extremely large data files. For example, a typical 15 mm×15 mm slide region at a scanning resolution of 50,000 ppi (i.e., 0.4 NA) would result in a file size of approximately 2.5 gigabytes ("GB"). At a scanning resolution of 100,000 ppi, the resulting file size quadruples to approximately 10 GB for the same 225 square millimeter area of a slide.

There are two basic methods that have been developed for scanning entire microscope slides: (i) conventional image tiling, and (ii) a novel line-scanning method and system developed by Aperio Technologies, Inc. This latter method utilizes a linear-array detector in conjunction with specialized optics, as described in U.S. patent application Ser. No. 09/563,437, entitled "Fully Automatic Rapid Microscope Slide Scanner," which is currently being marketed under the name ScanScope®.

Conventional image tiling is a well-known technique. Image tiling involves the capture of multiple small, statically sized regions of a microscope slide using a traditional fixed-area Charge-Coupled-Device ("CCD") camera, with each capture tile being stored as a separate individual image file. Subsequently, the various image tiles that comprise a specimen are digitally "stitched" together (i.e., alignment) to create a large contiguous digital image of the entire slide.

The number of individual image tiles required to scan a given area of a slide is proportional to the number of pixels that comprise each image tile. A typical video-format color camera has 768×494 pixels, which translates into 1.1 MB of imagery data per image tile. Recalling that a 1 $mm^2$ region of a slide corresponds to 11 MB of imagery data, it follows that approximately 10 non-overlapping image tiles must be captured to digitize one square millimeter of a slide at a scanning resolution of 50,000 ppi. At 100,000 ppi the required number of tiles increases four-fold to 40 image tiles per square millimeter.

It follows that for a typical 15 mm×15 mm slide region, at a scanning resolution of 50,000 ppi, a minimum of 2,250 individual image tiles must be captured. At a scanning resolution of 100,000 ppi, a minimum of 9,000 individual image tiles must be captured. Importantly, each image tile would have a file size of approximately 1.1 MB. In practice, an even larger number of tiles must be captured to provide sufficient overlap between adjacent tiles to facilitate the "stitching" together or alignment of adjacent image tiles.

Conventional image tiling systems generally take hours to capture and align the thousands of tiles required to digitize an entire microscope slide. Image capture times are significantly increased by the need to wait for the CCD camera to stabilize after being repositioned and before acquiring an image tile. This wait time is necessary to ensure that the captured image does not blur. Practical limitations in data processing speeds also make the alignment of large numbers of image tiles extremely slow. In practice, conventional image tiling systems are not able to align large numbers of tiles without creating "stitch lines" and other image artifacts that create computer imaging challenges.

An alternative to image tiling is the afore-mentioned line-scanning method. Rather than using a fixed-area camera to capture thousands of individual image tiles, the line-scanning method employs a linear-array detector in conjunction with a microscope objective lens and other optics to capture a small number of contiguous overlapping image stripes. Unlike the stop-and-go nature of conventional image tiling, the microscope slide moves continuously and at a constant velocity during acquisition of an image stripe. One of the many fundamental advantages of line-scanning over conventional image tiling is that the capture and alignment of a small number of image stripes is significantly more efficient than the capture and alignment of thousands of separately captured image tiles.

For example, a typical 15 mm×15 mm slide region at 50,000 ppi would require 15 image stripes, each with a width of 2,000 pixels, to digitally capture the region. Here, each image stripe would have a file size of approximately 170 MB. At 100,000 ppi, the same region would require 30 image stripes with each stripe comprising approximately 680 MB. The capture of 15 or 30 image stripes for a 15 mm×15 mm area is dramatically more efficient than the capture of 2,250 or 9,000 image tiles at 50,000 ppi or 100,000 ppi respectively. Furthermore, the continuous scanning nature of line-scanning makes it possible to create seamless virtual slides of a region in minutes.

In addition to rapid data capture, line scanning benefits from several advantages that ensure consistently superior imagery data. First, it is possible to adjust the focus of the objective lens from one scan line to the next, in contrast to image tiling systems that are inherently limited to a single focal plane for an entire image tile. Second, because the sensor in a line scanning system is one-dimensional, there are no optical aberrations along the scanning axis. In an image tiling system, the optical aberrations are circularly symmetric about the center of the image tile. Third, the linear detector has a one-hundred percent (100%) fill factor, providing full pixel resolution (8 bits per color channel), unlike color CCD cameras that lose spatial resolution because color values from non-adjacent pixels are interpolated (e.g., using a Bayer Mask).

To handle the immense amounts of data produced by conventional image tiling systems, data management tools have been developed to manage the thousands of relatively small (~1MB) image tiles typically generated by such systems. These data management utilities, however, are not suitable for managing a small number of relatively large (~200 MB) image stripes captured by the line-scanning image striping system.

Therefore, introduction of the superior image striping system and method for digitizing microscope slides has created a need in the industry for a data management system that meets the unique needs imposed by the new technology.

SUMMARY

The present invention provides a data management system and method for processing and handling the extremely large imagery data files (i.e., image stripes) that are rapidly produced by a linear-array-based microscope slide scanner. The system receives, processes, and stores the high volume of imagery data, which is produced by the linear-array-based microscope slide scanner at approximately 3 GB per minute.

The data are received as a series of coarsely aligned, slightly overlapping image stripes that are corrected for image non-uniformities and chromatic aberrations and then finely aligned into a seamless and contiguous baseline image. The baseline image is then logically mapped into a plurality of regions that are individually addressed to facilitate viewing and manipulation of the baseline image. These plurality of regions are referred to in the industry as "image tiles" but should not be confused with the various separate image files that are individually captured by a CCD camera in a conventional image tiling system.

The data management system enables imagery data compression while scanning and capturing new image stripes. This advantageously eliminates the overhead associated with storing uncompressed image stripes. The image compression also creates intermediate level images, thereby organizing the baseline image into a variable level pyramid structure referred to as a virtual slide.

The data management system efficiently converts image stripes into a high quality virtual slide that allows rapid panning and zooming by image viewing software. The virtual slide also allows efficient processing by an algorithm framework. Furthermore, the functions of real-time image processing, compression, and storage are combined with simultaneous and simplified multi-resolution viewing of high quality images at local and remote stations. The data management system is cost effective and scaleable, employs standard image file formats and supports the use of virtual slides in desirable applications such as telemedicine, telepathology, microscopy education, and the analysis of high value specimens such as tissue arrays.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 is a block diagram illustrating an example set of imagery data stripes superimposed on a slide specimen according to an embodiment of the present invention;

FIGS. 7A-7B are block diagrams illustrating an example set of misaligned imagery data stripes according to an embodiment of the present invention;

FIG. 12 is a block diagram illustrating an illumination correction table according to an embodiment of the present invention;

FIG. 16 is a block diagram illustrating an example stripe offset file according to an embodiment of the present invention;

DETAILED DESCRIPTION

Figure 1:
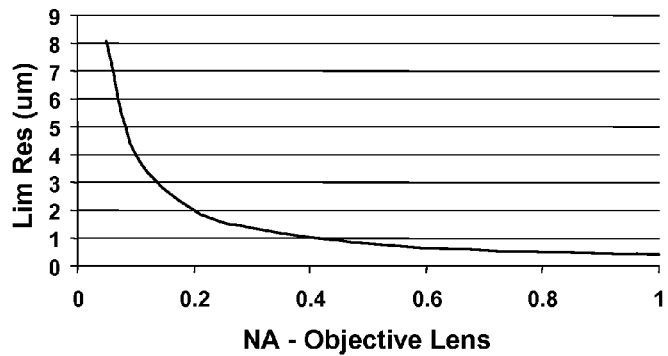
FIG. 1 is a graph diagram plotting the limiting resolution of an optical system versus the numerical aperture for the optical system's microscope objective lens.
Figure 2:
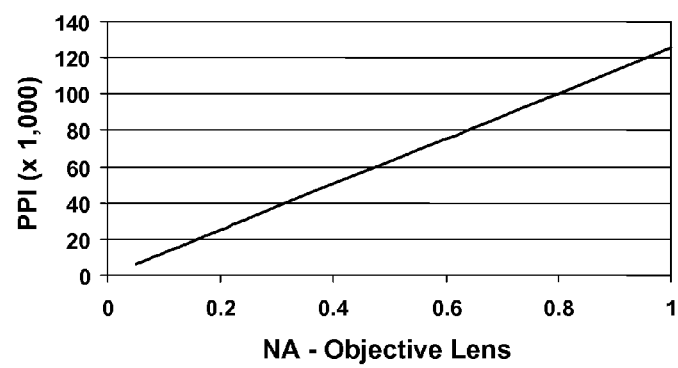
FIG. 2 is a graph diagram plotting the scanning resolution in pixels per inch versus the numerical aperture of an objective lens.
Figure 3:
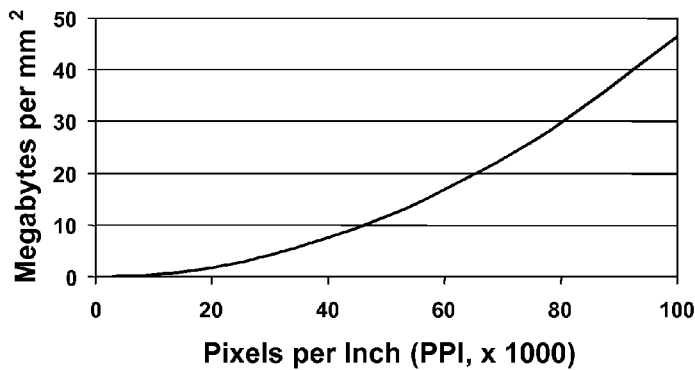
FIG. 3 is a graph diagram plotting the scanning resolution in pixels per inch versus the resulting uncompressed file size in megabytes for a one square millimeter region.

A linear-array-based microscope scanner system digitizes entire microscope slides or a large regions of a microscope slide in a way that produces a small number of slightly overlapping image stripes. These stripes, although small in number, are very large in size, for example around 200 MB per stripe. Because these image stripes are large and are produced so rapidly by the microscope scanner system (e.g., 3 GB per minute), conventional methods of receiving, processing, and storing digital image files are inadequate.

Described herein are certain systems and methods that address the unique data management challenges created by the new microscope slide scanner system. For example, extremely accurate and very fast methods for combining the image stripes into a seamless contiguous image have been developed that allow the stripe alignment process to take place during data capture (i.e, a scan). Stripe alignment while scanning advantageously eliminates the need for the extremely large image stripes to be stored on the hard disk while the remaining stripes are captured and then later loaded individually into memory for alignment after the scan is completed. Additionally, stripe alignment while scanning advantageously allows image data compression contemporaneously with scanning (i.e., in real time) and completely eliminates the need to store uncompressed image stripes. The seamless contiguous image created by the alignment of image stripes is referred to herein as a baseline image. The baseline image is further organized into a pyramid structure that is referred to as a virtual slide.

Additionally, methods for logically indexing the complete baseline image (i.e., after the image stripes comprising the baseline image have been aligned) have been developed to allow rapid panning and zooming of the virtual slide by the virtual slide viewing software. These methods advantageously allow a technician or clinician to view any portion of the virtual slide at various levels of magnification including a low resolution such as the naked eye might see or a higher diagnostic resolution as required for the technician or clinician to visualize the details required to make a diagnosis.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Introduction

In a data management system for a linear-array-based microscope slide scanner, certain functions are paramount. These functions include: (1) image processing during image capture; and (2) image data file organization. Image processing during image capture includes the manner in which the image stripes are processed in parallel with, or immediately following data capture. Particular aspects of image processing include corrections for optical aberrations (e.g, color, uniformity of illumination), the manner in which the overlapping image stripes are combined (i.e., alignment), and the means of organizing and storing imagery data to support efficient viewing on a display monitor, for example, the viewing of virtual slides that represent imagery data organized into pyramids. Image data file organization includes the manner in which image stripes are compressed and organized for optimal viewing, including rapid panning and zooming when a virtual slide is accessed over a network.

Preferably, the data management system is optimized for a specific method of image capture. With respect to image stripes that are generated by a line-scanner, and in particular a linear-array based microscope slide scanner, the data management system preferably provides: (1) runtime management of data during data capture; (2) efficient viewing of very large (e.g., gigabyte) image files; (3) robust image quality; (4) efficient organization of the imagery data into a standard image file format; and (5) cost effectiveness and scalability.

First, it is desirable to manage the line-scanner imagery data in as near to real-time as possible. This means processing the image stripes as quickly as they are output by the linear array detector, which is part of the line-scanner. The desire for such efficiencies is driven by the throughput requirements of laboratories, including anatomic pathology laboratories that on a daily basis process hundreds of microscope slides representing hundreds of gigabytes of imagery data. The challenges of supporting the approximately 3 GB per minute line-scan data rate of Aperio Technologies' current ScanScope® are formidable, especially since it may require several minutes just to write a 3 GB file to a typical hard drive.

Second, the data management system preferably supports the efficient viewing of virtual slides. Virtual slides can be displayed on a monitor that is connected to a local computer or on a monitor that is connected to a remote networked computer. The network, of course, can be a local area network, a wide area network, or even the ubiquitous Internet. For example, in the case of a pathology microscope virtual slide that is viewed remotely, the data management system should support the telemedicine application generally referred to as telepathology and additionally support the simultaneous and coordinated viewing of a virtual slide by multiple parties.

Additionally, the virtual slide viewing software preferably supports the viewing of entire digitized microscope slides with greater efficiency than the conventional viewing of a comparable glass microscope slide under a microscope. The virtual slide viewing software minimizes the time required to wait for screen updates, advantageously enabling local viewing as well as the remote viewing of virtual slides across a variety of networks. Advantageously, standard image file formats such as the tagged image file format ("TIFF") support rapid random access to image data at any desired level of resolution.

Third, the data management system preferably maintains the highest possible image quality throughout the data management process. The image stripes generated by the line-scanner are already of high quality (100 percent fill factor), and it is preferable that any required pre-processing or post-processing operations (e.g., the correction of optical and detector non-uniformities) do not unnecessarily degrade the image quality of the image stripes. Similarly, the data management system should support the lossy or lossless compression of the image stripes in order to satisfy a variety of end-user needs. Advantageously, lossy image compression approaches, including JPEG2000, yield high-quality results when subjectively viewed by human experts.

Fourth, the data management system preferably supports the efficient application of image processing algorithms to an entire virtual slide or to one or multiple selected areas of the virtual slide, at varying levels of resolution. Preferably, the virtual slide image file format supports rapid sequential access of a virtual slide, or a region of a virtual slide, by programs that implement image processing algorithms.

Finally, the data management system is preferably cost-effective, scaleable, and capable of implementation using off-the-shelf personal computers and conventional file servers and networking equipment. The data management system is also advantageously applicable to any type of microscopy imagery data captured by a high-resolution line-scanner, regardless of whether the imagery data represents transmitted light, fluorescence, darkfield, interference contrast, reflected light, phase-contrast or data corresponding to other microscope modalities. Furthermore, the data management system is preferably also applicable to line-scan imagery data that is captured from samples that are not microscope slides, including, for example, materials such as semiconductors, circuit boards, micro-well plates, and non microscopy imagery data captured from satellites and other types of space exploration vehicles.

Image Processing During Capture

Figure 4A:
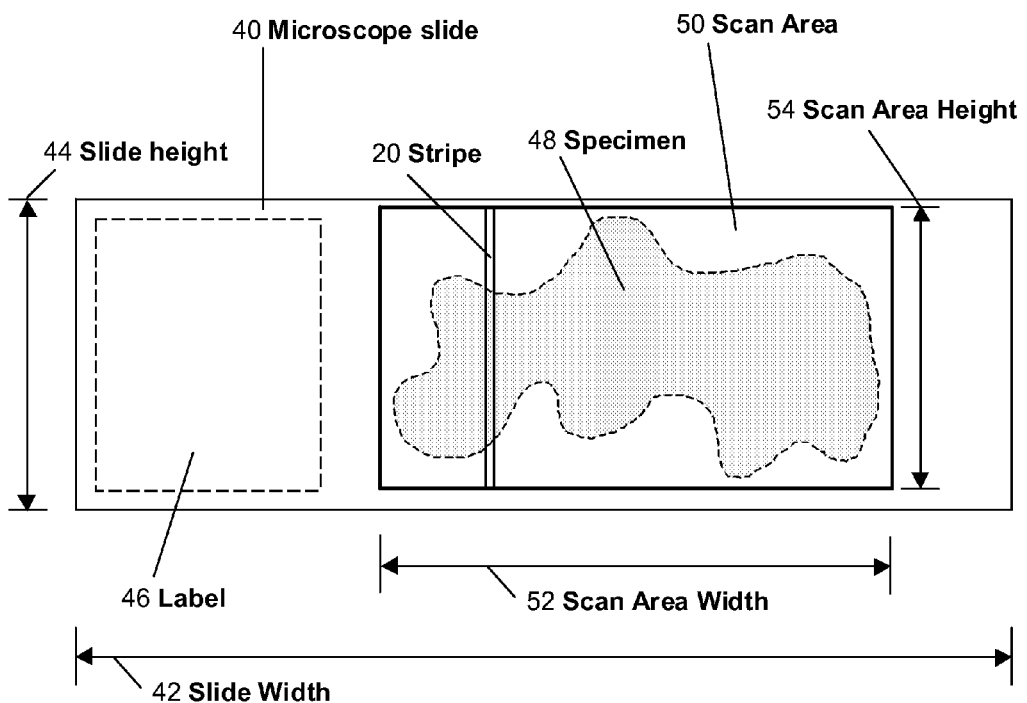
FIGS. 4A-4B are block diagrams illustrating example microscope slides with superimposed imagery data stripes according to an embodiment of the present invention.
Figure 4B:
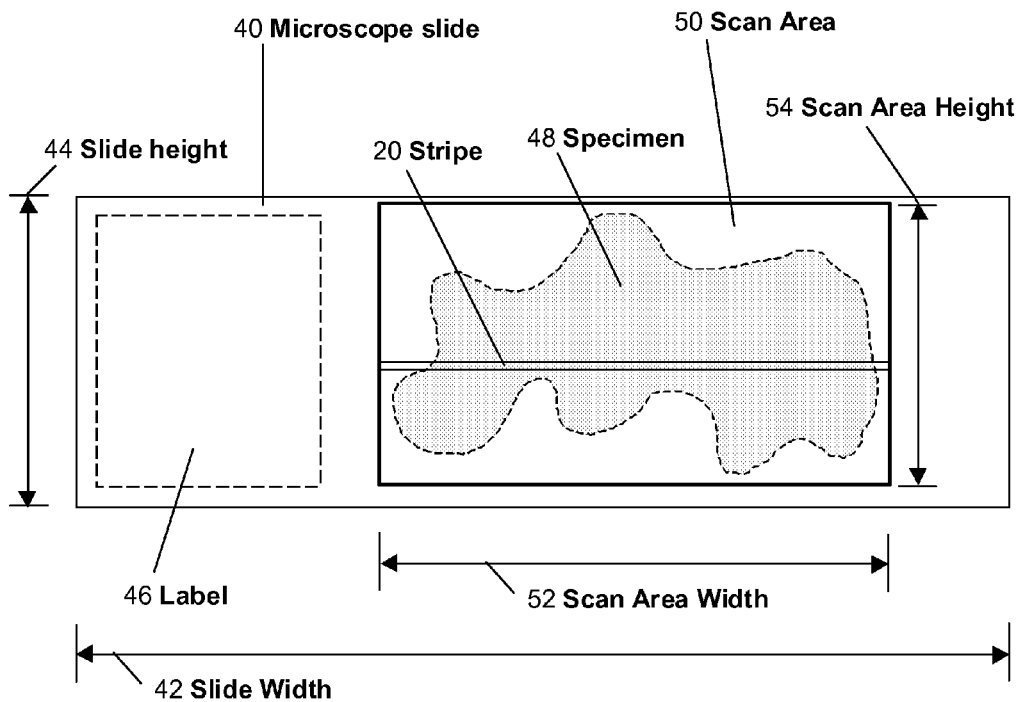

FIGS. 4A-B are block diagrams illustrating sample microscope slides 40 with superimposed imagery data stripes 20 according to an embodiment of the present invention. In both figures, a specimen 48 is shown on the microscope slide 40. A typical microscope slide 40 has a slide width 42 of approximately 75 mm and a slide height 44 of approximately 25 mm. A label 46 is usually fastened on one end of the slide and often holds a printed barcode or other sample-specific information. The scan area 50 designates that area of the microscope slide 40 that should be scanned by the line-scanner. Preferably, the rectangular scan area 50 is selected to be just slightly larger than the largest dimensions of the specimen 48. The width of the scan area 50 is given by the scan area width 52, while the height of the scan area 50 is given by the scan area height 54.

Turning to FIG. 4A, the orientation of stripe 20 is perpendicular to the slide width 42. The advantage of this orientation is that the size of each stripe 20 is smaller. For example, a maximum of 293 MB is needed to scan stripe 20 at 50,000 ppi and a maximum of 586 MB is needed to scan stripe 20 at 100,000 ppi. The disadvantage is a larger number of stripes 20. From a data management perspective, the shorter image stripe configuration shown in FIG. 4A is preferable, in part because the slide digitization can be accomplished more efficiently using the 1-2 GB memory capabilities of currently available off-the-shelf workstations.

A stripe 20 is shown in FIG. 4A to illustrate the relationship between the image stripe 20 and the specimen 48. At a scanning resolution of 50,000 ppi, a 2,048 pixel linear array covers a physical dimension of about 1 mm. In the case of a scan area width 52 of 20 mm, approximately twenty stripes 20 are required to digitize the scan area 50 that encompasses the specimen 48. One of the advantages of defining a rectangular scan area 50 is that each of the stripes 20 has a similar stripe width. More sophisticated definitions of the scan area 50 are clearly possible if one wanted to more precisely match the scan area 50 to the physical area of the specimen 48, for example, in the case of multiple fine needle biopsies that are placed over the entire slide area leaving blank space between tissue areas, or in the case of a tissue microarray in which hundreds of small tissue cores are arrayed on a microscope slide.

In the illustrated embodiment in FIG. 4B, the orientation of the stripe 20 is parallel to slide width 42. An advantage of this orientation is that the number of stripes 20 is limited to approximately 25 stripes at a scanning resolution of 50,000 ppi and 50 stripes at a scanning resolution of 100,000 ppi. A disadvantage is that the size of a stripe 20 can become quite large, especially if the scan area width 52 comprises a large portion of the slide width 42. For example, if the scan area width exceeds 50 mm, the file size for a single stripe 20 can reach up to 1 GB.

Figure 5:
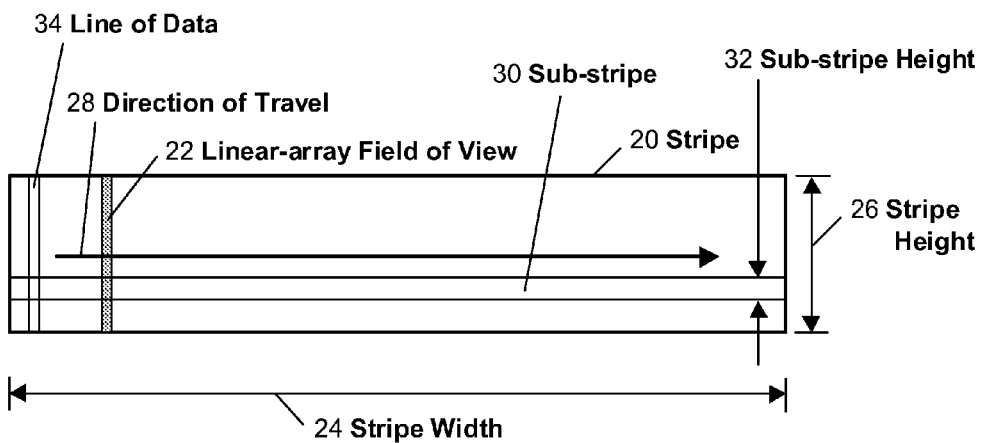
FIG. 5 is a block diagram illustrating an example imagery data stripe according to an embodiment of the present invention.

FIG. 5 is a block diagram illustrating an image stripe 20 according to an embodiment of the present invention. A stripe 20 is a digital image with a width given by stripe width 24 and a height given by stripe height 26. A sub-stripe 30 is a digital image with a width given by stripe width 24 and a height given by sub-stripe height 32.

A line-scanner typically generates a stripe 20 by capturing an entire stripe (digital image), one line of data 34 at a time. This line of data 34 is preferably one pixel wide in each color channel, and has a height equal to the stripe height 26. The line of data 34 may also be referred to herein as a column of pixels. The line scanner digitally captures a stripe by moving a linear-array field of view 22 (e.g., the field of view resulting from a linear detector in conjunction with a microscope objective lens) in a direction of travel 28 with respect to the slide. Undistorted imagery data is obtained by synchronizing the line rate of the linear array detector to the velocity of the microscope slide. For example, the microscope slide preferably moves underneath the objective lens of the slide scanner.

Depending on the type of linear-array detector employed, a line-scanner can produce stripes 20 in monochrome or color. In the case of a color line scanner, a single line of data 34 may actually correspond to three lines of monochrome data (i.e., three columns of pixels), one line for each of the three color channels (red, green and blue).

For samples such as microscope specimens, the diagnostic resolution is typically 50,000 to 100,000 ppi, or about 100 times higher than the scanning resolution of a conventional document scanner. At these resolutions, the stripe height 24 corresponds to a physical dimension of between 0.5 mm and 1.0 mm, when a linear-array detector comprising 2,048 pixels is used. While it is possible to utilize linear arrays of varying dimensions, a 2,048 pixel linear array is preferred.

It should be clear that it is possible to capture image stripes having any height less than or equal to the maximum number of pixels in the linear array. There are instances when it might be desirable to capture image stripes having a narrow stripe height 26 (i.e., less than 2,048 pixels) and/or a variable stripe height 26, for example, when the tissue topology is such that one or both edges of a stripe are not perfectly focused. Advantageously, the data management system is adaptable to accommodate these more sophisticated scanning approaches.

In the case of a 2,048 pixel linear-array, each pixel covers a physical sample distance of 0.5 µm per pixel at 50,000 ppi, and 0.25 µm per pixel at 100,000 ppi. Additional nontrivial optics and focus adjustments are required to collect light from such a small physical area of the specimen and to focus it onto a linear array that, in the case of a 2,048 pixel array, measures approximately 28 mm. Preferably, the captured imagery data is well focused and has been acquired by a line-scanner that is capable of acquiring the image in stripe format.

For a microscope specimen that measures 25 mm along one dimension, the dimensions of stripe 20 are 1.0 mm by 25 mm at a scanning resolution of 0.5 µm per pixel. This translates into a stripe 20 that comprises 2,048 pixels by 50,000 pixels. Assuming 24-bit pixels (8-bits for each of red, green, and blue color channels), a single stripe 20 comprises about 102 million pixels, or 293 MB of color imagery data. At a higher scanning resolution of 0.25 µm per pixel (i.e., 50,000 ppi), the dimensions of stripe 20 are 0.5 mm by 25 mm, or 2,048 pixels by 100,000 pixels. In this latter case each stripe 20 comprises 205 million pixels, or 586 MB of color imagery data. Multiple stripes 20 are captured by the line-scanner to digitize a typical microscopy specimen, for example, a tissue or cytology specimen that may consist of several hundred square millimeters of slide area. These multiple stripes 20 are then aligned to create a seamless large contiguous image of the entire microscope specimen.

Preferably, the microscope slide line-scanner can acquire and output color data at 9,000 lines per second using a line-scan camera such as the Basler L301bc. This camera features a 2,048 pixel linear-array that can scan a stripe 20 at 55 MB of color imagery data per second, or 3.3 GB per minute. At this data rate, a single stripe 20 with a stripe width of 25 mm comprises 293 MB and can be scanned in 5.3 seconds. There are several reasons why the effective data rate for capturing multiple stripes 20 can be less than 3.3 GB per minute, including (i) delays associated with accelerating to and decelerating from the constant velocity at which image data are captured; (ii) processing delays such as correcting for non-uniform illumination; (iii) mechanical delays associated with physically moving the linear-array detector from one stripe 20 to another; (iv) processing delays associated with aligning adjacent stripes 20; (v) data compression delays, and (vi) delays associated with saving the imagery data corresponding to a stripe 20. One advantage of the present invention is to minimize these delays so as to achieve a high effective scanning data rate.

FIG. 6 is a block diagram illustrating an example set of image stripes 20 superimposed on a slide specimen according to an embodiment of the present invention. The same specimen 48 and scan area 50 described previously are shown, together with several superimposed stripes 20. Optimally, the stripes 20 are perfectly synchronized and aligned during the capture process, however in practice, upon capture, the stripes 20 may be both misaligned and overlapped.

FIG. 7A is a block diagram illustrating an example set of misaligned image stripes 20 according to an embodiment of the present invention. In the illustrated embodiment, adjacent stripes 20 are offset from one another by a coarse stripe offset 56. For example, in a microscope slide scanner that captures 9,000 lines of data per second, a 100 msec difference in the start of the acquisition of adjacent stripes 20 may correspond to a coarse stripe offset 56 of 900 pixels.

Thus, there is a need to coarsely align the stripes 20 along the direction of travel 28. This coarse alignment, as well as the subsequent fine alignment that is required to provide accurate pixel-to-pixel registration between adjacent stripes 20, can be accomplished as a post-acquisition operation after all of the stripes 20 that comprise the scan area 50 have been acquired. The disadvantage of such a post-acquisition stripe alignment is that the captured stripes are saved to disk until the entire scan area is captured. Then all the stripes 20 have to be read from the hard disk into memory to facilitate coarse and fine alignment. Given the size of the stripes 20, this approach can be extremely time-consuming. Preferably, alignment of adjacent stripes can be accomplished during the scanning process, while adjacent stripes 20 are in memory, and prior to saving the stripes 20 or the virtual slide on the hard disk of a computer or in other persistent memory.

FIG. 7B is a block diagram illustrating an example set of overlapping and mis-aligned image stripes 20 according to an embodiment of the present invention. In the illustrated embodiment, the image stripes 20 are intentionally overlapped in the axis that is transverse to the direction of travel 28. This overlapping of image stripes facilitates the alignment of adjacent 28. Notably, the size of the stripe overlap 58 must be sufficient to support the fine alignment of adjacent stripes, and is preferably 40 pixels.

Figure 8:
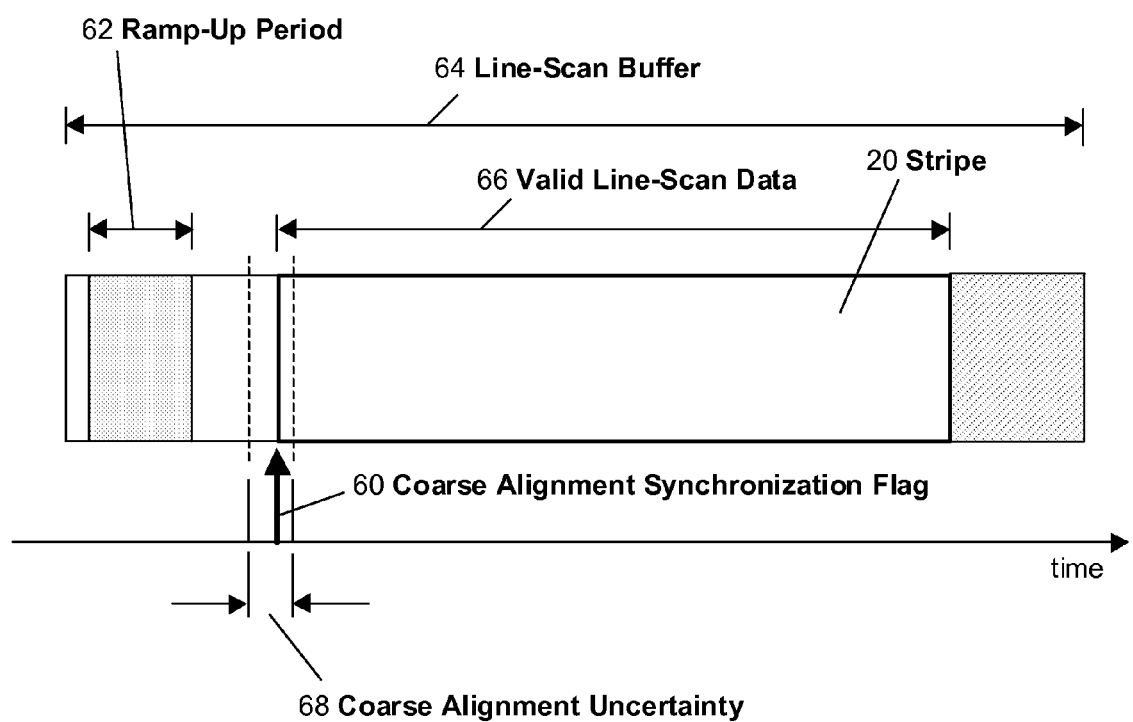
FIG. 8 is a block diagram illustrating an example misaligned imagery data stripe prepared for alignment according to an embodiment of the present invention.

FIG. 8 is a block diagram illustrating an example image stripe 20 prepared for alignment according to an embodiment of the present invention. The need for aligning the data stripes arises from the realization that data latencies in conventional operating systems and the slide positioning hardware of typical line-scanners do not make it possible to begin each stripe at exactly the same location for each stripe 20. Preferably, an external synchronization method can be used to coarsely align the stripes 20 during scanning, followed by an iterative fine-alignment process.

For example, the line-scanner preferably provides position feedback information from a position encoder that is mounted either to the motor or to the mechanical stage that is moving the microscope slide during scanning. This position feedback information, together with prior knowledge of the dimensions and location of the scan area on the microscope slide, are used to set a coarse alignment synchronization flag 60 when the line-scanner reaches the beginning of the scan area 50. Due to data latencies in the overall line-scanning system, the coarse alignment uncertainty 68 in issuing the coarse alignment synchronization flag 60 is approximately ±2 milliseconds, which translates into ±18 lines of data at a scanning rate of 9,000 lines per second. Since the line-scanner must be moving at constant velocity while capturing valid line-scan data 66, it is necessary to allow the line-scanner enough time to accelerate to the desired velocity during a ramp-up period 62. The typical ramp-up period corresponds to less than 1 mm of travel of the line-scanner.

In a preferred embodiment, a large line-scan buffer 64 is established as soon as the line-scanner begins its motion. Imagery data are captured and temporarily stored in the line-scan buffer 64 as the line-scanner moves across the microscope slide 40. At some time during the capture of the line-scan buffer 64, the coarse alignment synchronization flag 60 is set. This flag is preferably set using a strobe light that saturates the linear-array detector in those lines of data of the line-scan buffer 64 that correspond to the desired starting point of the valid line-scan data 60.

For example, when using the Basler L301bc detector, three saturated columns (lines) of pixels, each separated by eight pixels and corresponding to red, green, and blue respectively are clearly apparent in the line-scan buffer 64. Following capture of the entire line-scan buffer 64, the leading edge of the red column of saturated pixels can be identified. To eliminate those lines containing saturated pixels, the beginning of the valid line-scan data 66 can be designated as being the fiftieth column of pixels following the leading column of red saturated pixels. Knowledge of the dimensions of the scan area makes it possible to determine how many lines of data comprise the valid line-scan data 66, that is, the line-scan imagery data desired in the image stripe 20. Therefore, instead of saving the entire line-scan buffer 64 that has been buffered, all of the columns of pixels that precede the beginning of the valid line-scan data 66, and those that follow the end of the valid line-scan data 66, are eliminated prior to saving the image stripe 20.

The aforementioned use of a strobe light for setting the coarse alignment synchronization flag 60 is particularly useful when the data capture board that directs the line-scan data to a temporary buffer cannot be triggered externally to start or stop the capture of line scan data. In the event that the data capture board supports an external trigger to start or stop data capture, an alternate preferred method for coarsely aligning the image stripes 20 is to initiate the data capture using an external trigger after a coarse alignment synchronization flag 60 has been set. In such an embodiment, the line-scan buffer 64 and the valid line-scan data 66 are identical because the data in the line-scan buffer 64 begins with the setting of the synchronization flag 60. Advantageously, no data are captured prior to the coarse alignment synchronization flag 60.

Similarly, the data capture board can be triggered again, this time to turn off the capture of valid line-scan data 66, when the desired number of lines of data comprising the valid line-scan data 66 have been captured. It should be clear that it is not necessary to use a strobe light if the data capture board can be triggered externally. A preferred method is to use the position encoder output to initiate the external trigger to the data capture board.

Figure 9A:
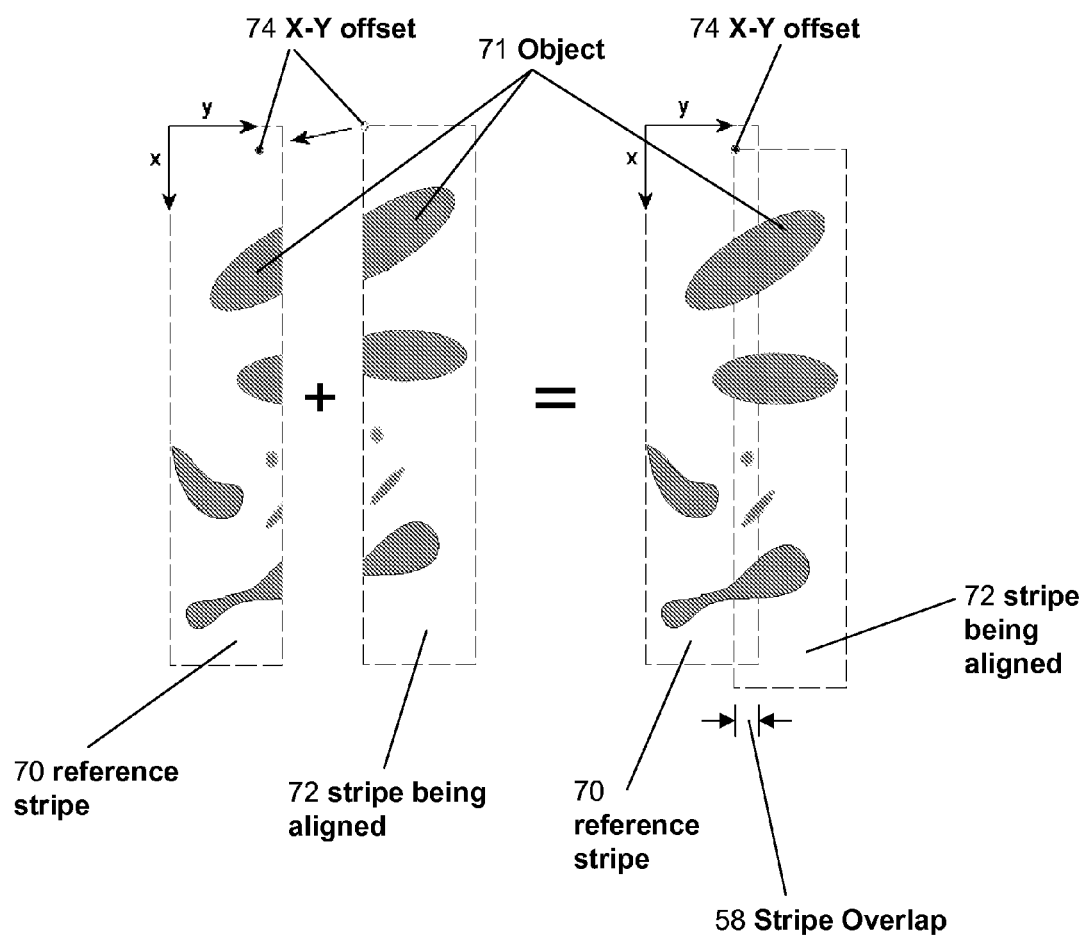
FIG. 9A is a block diagram illustrating an example pair of imagery data stripes and their alignment according to an embodiment of the present invention.

FIG. 9A is a block diagram illustrating a pair of image stripes and their alignment according to an embodiment of the present invention. Overlapping stripes are aligned by pattern matching within the stripe overlap 58, a region that is preferably 40 pixels wide. The alignment results in an X-Y offset 74 for each stripe. The X-Y offset 74 denotes the exact (x,y) coordinate location in the reference stripe 70 where the adjacent stripe being aligned 72 will be placed. The resulting composite of the aligned reference stripe 70 and stripe being aligned 72 is also shown in FIG. 9A. Advantageously, in the stripe overlap region 58, the imagery data from one stripe is used while the redundant imagery data in the adjacent stripe can be discarded.

In one embodiment, calculation of the optimal X-Y offset 74 proceeds by testing a range of possible offset values along both the x-axis (i.e., the scanning axis that indicates the direction of travel 28) and the y-axis (i.e., the axis that is transverse to the direction of travel 28). A potential X-Y offset 74 is chosen and the stripe being aligned 72 is shifted to the corresponding coordinate location in the reference stripe 70. The pixel intensity values in the reference stripe 70 are then subtracted from the shifted-pixel values in the stripe being aligned 72 for all pixels in the overlap region 58 for the color channel exhibiting the highest signal-to-noise ratio. These differences are then squared to yield a positive number and summed. This sum is a measure of alignment error for the particular X-Y offset 74 being tested. After testing all possible X-Y offset 74 in the allowable range, the X-Y offset 74 pair with the smallest sum-value is chosen as the alignment X-Y offset 74. This method advantageously finds the point of maximum correlation between the two stripes.

The range of x-values to be tested can be determined by the coarse alignment uncertainty that gives rise to different values of the coarse stripe offset 56. The range of y-values to be tested can be determined by the mechanical motion uncertainties (e.g., position error) from stripe to stripe. There is no upper limit to the range of values to be tested, although the reference stripe 70 and the stripe to be aligned 72 need to overlap for the offset (correlation) calculation to be successful.

A significant improvement in stripe alignment performance is obtained by selectively including pixels in the region corresponding to the overlap of reference stripe 70 and the stripe being aligned 72 in the computation of the error sum that is used for computing the correlation between stripes. For example, pixels to be included in the stripe alignment calculation can be selected according to the premise that objects, such as object 71, that are divided between two adjacent stripes will be aligned when their corresponding edges are aligned. Because objects are 2-dimensional and their corresponding edges are 1-dimensional, the edge pixels, which are much smaller in number, are preferably used for stripe alignment.

Edge pixels can be identified by a large value in the local intensity gradient. For example, the pixels in reference stripe 70 corresponding to stripe overlap 58 are first sorted according to the local intensity gradient value. The sorted list is then used to define a small subset of pixels from within all the pixels comprising stripe overlap 58 having the largest intensity gradient values. This list is then used for computing the error sum at each potential X-Y offset 74. In practice, it has been demonstrated that 2,000 object-edge pixels, from the more than 500,000 pixels in a typical stripe overlap 58 are sufficient to yield accurate X-Y offset 74. This significant reduction in the number of pixels examined correspondingly reduces calculation time by more than a factor of 100, and allows the stripe alignment to be successfully completed in a few seconds on a typical personal computer (PC). This drastic reduction in stripe alignment time advantageously allows the stripe alignment to take place during the data capture process, while adjacent stripes are resident in memory.

Figure 9B:
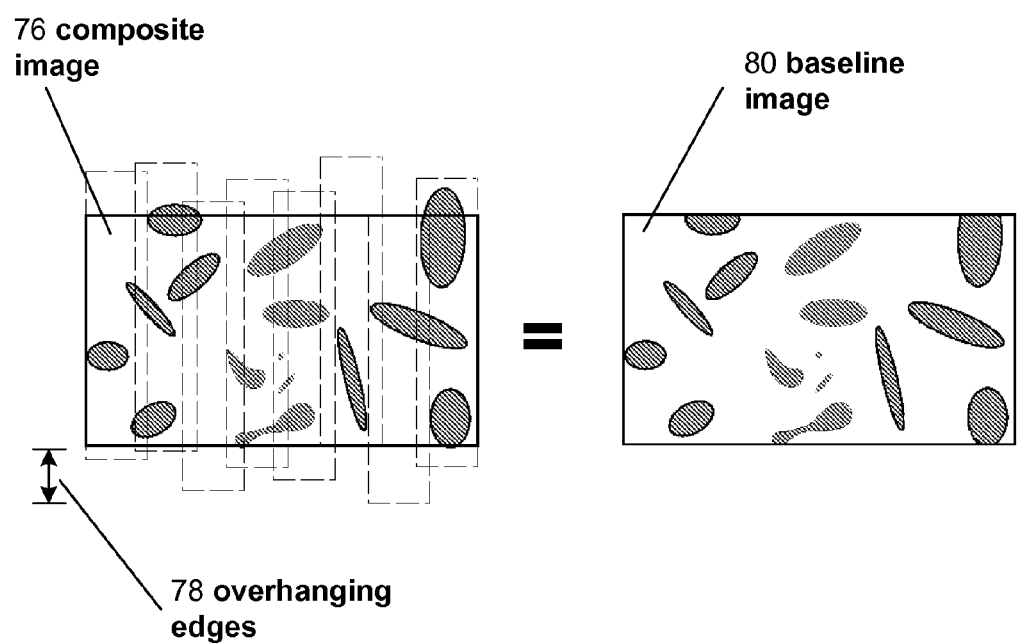
FIG. 9B is a block diagram illustrating an example set of aligned imagery data stripes and the resulting baseline image according to an embodiment of the present invention.

FIG. 9B is a block diagram illustrating an example composite image 76 and the resulting baseline image 80 according to an embodiment of the present invention. Once all the stripes have been aligned and combined into a composite image 76, there may be a number of overhanging edges 78. These edges 78 can advantageously be cropped from the composite image 76 to create the baseline image 80.

It is noteworthy that accurate alignment of adjacent stripes 20 requires only linear translations between stripes. No warping or other non-linear transformations are required to create seamless baseline images. One of the underlying reasons for creating seamless imagery data is founded in the ability of the linear-array-based microscope slide scanner to maintain constant velocity during scanning. A second reason for the ability of a linear scanner to achieve seamless images is consistently superior imagery data, which is a direct and inherent result of data capture using a line-scanner.

Figure 10:
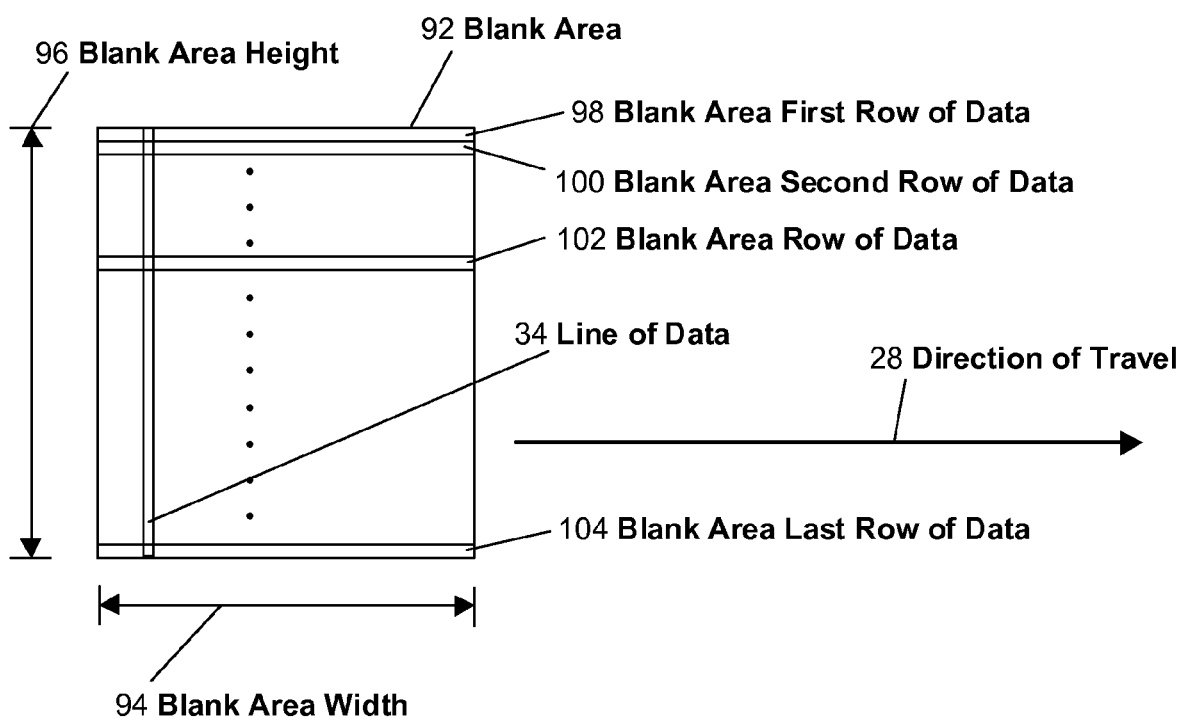
FIG. 10 is a block diagram illustrating an example blank area of a slide according to an embodiment of the present invention.

FIG. 10 is a block diagram illustrating an example blank area 92 of a microscope slide 40 according to an embodiment of the present invention. The blank area 92 is preferably used for illumination correction. Illumination correction is needed to correct the raw imagery data that is captured by the line-scanner for artifacts such as shading, pixel-to-pixel non-linearities and to compensate for the opacity and refractive properties of the slide glass, including the effects of the mounting media. The blank area 92 has a blank area width 94 that comprises an arbitrary number of lines of data 34. A typical value for the blank area width 94 is 2,000 lines of data. The blank area height 96 may correspond to the number of pixels in the linear-array detector. The blank area height 96 is preferably 2,048 pixels. A blank area row of data 102 comprises the intensities measured by the same pixel in each of the lines of data 34 that comprise the blank area 92. In the preferred embodiment, there are 2,048 rows of data, starting with a blank area first row of data 98, followed by a blank area second row of data 100, and ending with a 2,048$^{th}$ blank area last row of data 104.

Optimally, all of the intensity values in the blank area 92 are the same since the ideal blank area is entirely uniform and there are no pixel-to-pixel variations between blank area rows of data 102. In practice, however, there may be spatial artifacts in the blank area that are preferably ignored in the computation of any illumination correction. Consequently, there will be pixel-to-pixel variations along a given blank area row of data 92. Shading and other aberrations can also contribute to variations in the intensity values along the length of the linear-array (i.e., along the blank-area height 96).

Figure 11:
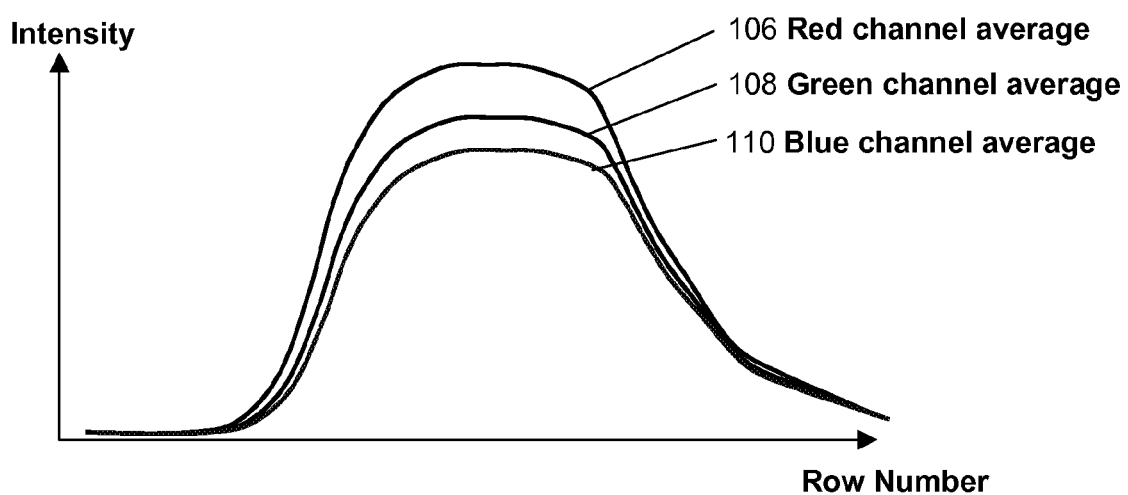
FIG. 11 is a graph diagram plotting the red/green/blue intensity values for sub-stripe rows according to an embodiment of the present invention.

FIG. 11 is a graph diagram plotting example values of the red, green and blue intensity values for an image stripe 20 that corresponds to a blank area 92 according to an embodiment of the present invention. In the illustrated embodiment, the following three-step procedure can be used to compute the average intensity of each row of pixels in the blank area 92: (i) for each color channel, the average of the intensities of each pixel within a blank area row of data 102 is computed; (ii) any pixels having an intensity value that differs by more than 5 counts from the average computed in step (i) are eliminated; and (iii) the average values originally computed in step (i) are re-computed without the contributions of the pixels discarded in step (ii). This procedure provides a means of excluding debris in the blank area and provides an average intensity value for each pixel for each color channel as shown in FIG. 11.

FIG. 12 is a block diagram illustrating an illumination correction table 112 according to an embodiment of the present invention. In the illustrated embodiment, the entries in the illumination correction table 112 are obtained by calculating, for each pixel and for each color channel, the ratio between an intensity value that is defined to represent white and the average value computed from within the blank area 92. For example, if the average red intensity for pixel number 603 is 203 counts, and white is defined to represent a count of 245 for each channel, then the entry in the illumination correction table 112 is 245/203, or 1.197. Any data that are subsequently captured are corrected by multiplying the pixel-specific and color-specific entries in the illumination correction table 112 by the actual intensity output by the scanner.

Figure 13:
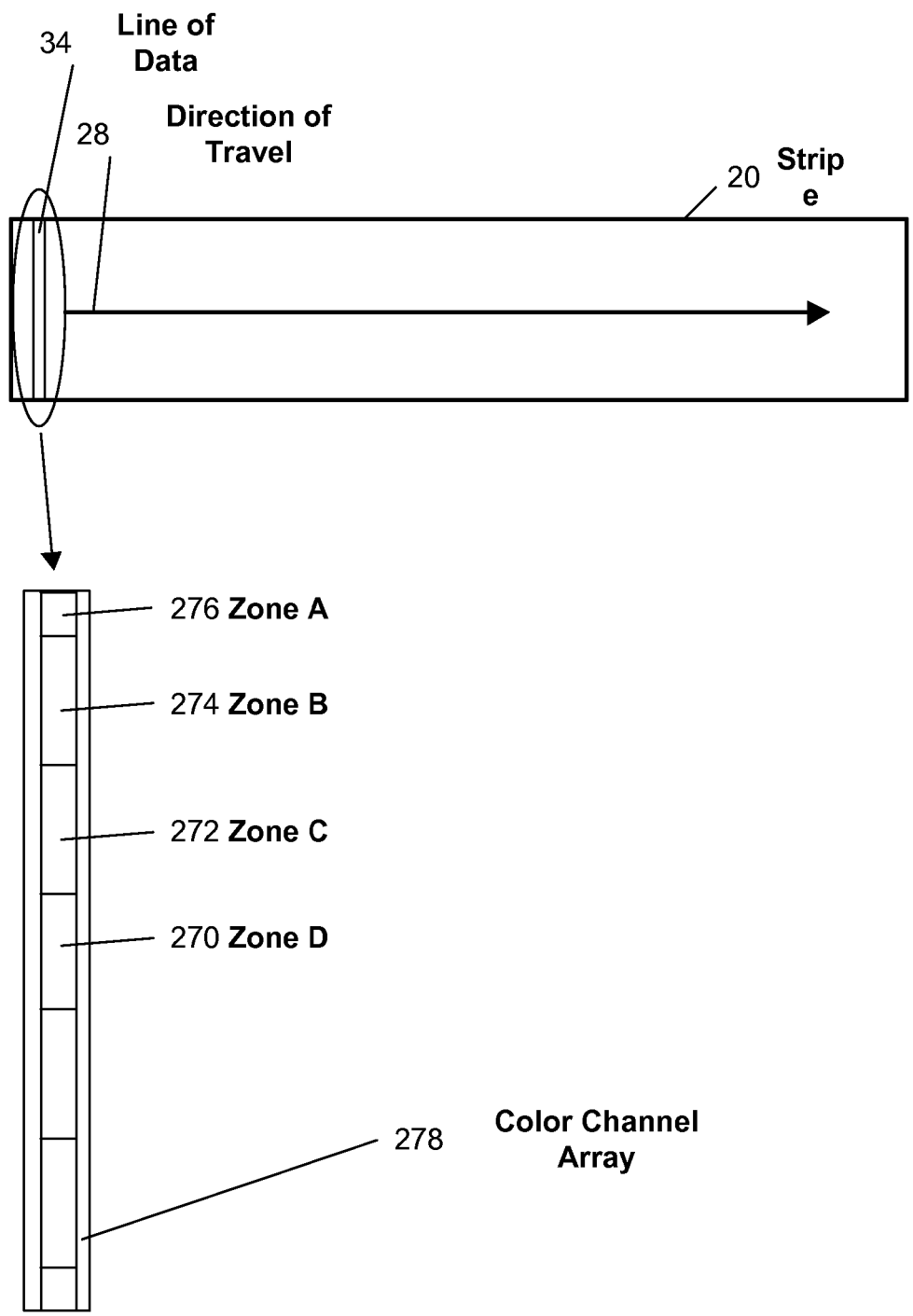
FIG. 13 is a block diagram illustrating an example imagery data stripe having a line of data with various color channels according to an embodiment of the present invention.

FIG. 13 is a block diagram illustrating an example image stripe 20 having a line of data 34 with various color channels according to an embodiment of the present invention. Chromatic aberrations result because light at different wavelengths takes a slightly different path through the optical system of the scanner, resulting in shifts of multiple pixels between color channels at the outermost edges of a stripe. Longer wavelength light (red) will result in slightly wider stripes than blue light. Chromatic aberration correction involves shifting the pixels of the independent color channels of the line-scan imagery data "inward" from the edges of a stripe 20 by a pre-determined amount. The amount of pixel shift required to correct for chromatic aberrations is determined empirically. The pre-determined amount of pixel shifting is a function of the optics of the scanner, and different optical designs may be subject to more or less chromatic aberrations.

In the illustrated embodiment, a stripe 20 having a height of 2048 pixels is captured by a linear-array based scanner having a direction of travel 28. The red color channel, illustrated by color channel array 278, is divided into various zones of pixels, including: (i) an outermost Zone A (276) comprising 139 pixels; (ii) an intermediate Zone B (274) comprising 360 pixels; (iii) an intermediate Zone C (272) comprising 360 pixels; and (iv) a central Zone D (270) comprising 330 pixels. Preferably, each zone can be shifted inward by a different, fixed amount of pixels. For example, pixels in zone A are shifted inward by 3 pixels, pixels in zone B are shifted inward by 2 pixels, pixels in zone C are shifted inward by 1 pixel and pixels in zone D are not shifted.

The shifting of pixels to compensate for chromatic aberrations preferably results in a stripe 20 that may be slightly narrower than the original imagery data, and any excess pixels at the edge having less than three color channels are trimmed off. The amount of pixel shifting is less for the green color channel where only three zones of pixels are defined. Pixels in the blue color channel are not shifted at all. For shorter stripes (e.g., 1000 pixels) the amount of pixel shifting can advantageously be pro-rated based on the height of the stripe.

Figure 14:
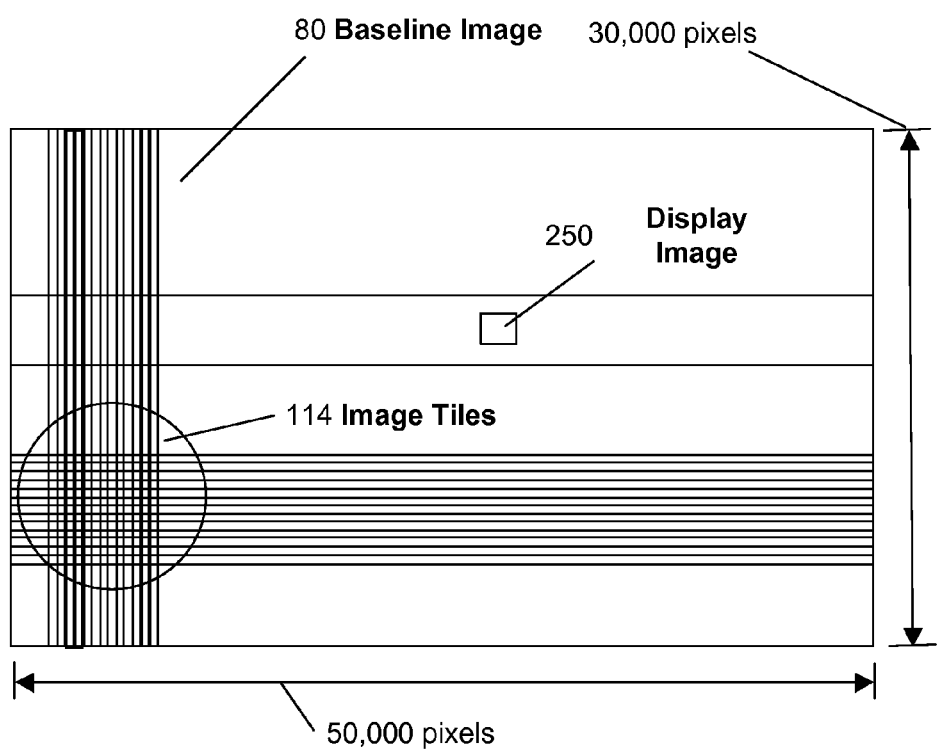
FIG. 14 is a block diagram illustrating an example baseline image with quadrants according to an embodiment of the present invention.

FIG. 14 is a block diagram illustrating an example baseline image 80 comprising standard image tiles 114 in accordance with the standard tiled TIFF image format. Note that the process of logically organizing image stripes into standard image tiles 114 refers to the data organization of the captured stripes 20, and is unrelated to the method of image acquisition. In contrast to a conventional image tiling system where individual image tiles are acquired by a CCD camera, standard image tiles 114 are a well-known method for organizing and manipulating high-resolution images, as will be understood by one having ordinary skill in the art.

The advantages of tiled TIFF images are well-known. For example, the TIFF Specification, Revision 6.0 (Jun. 3, 1992), which is incorporated herein by reference in its entirety, discusses the benefits of tiling for high resolution images. These benefits include more efficient access to the image and improved compression. Thus, while the most efficient way to capture imagery data can be to acquire the imagery data as stripes using a linear-array-based scanner, there are also significant advantages to organizing the image stripes, after they have been captured, into standard image tiles 114. Advantages of tilizing image stripes include providing rapid access to sub-regions of the baseline image 80, supporting rapid panning and zooming by image viewing software, and the processing of image data.

In the illustrated embodiment, a baseline image 80 is shown comprising 50,000 pixels (width) by 30,000 pixels (height). Baseline image 80 may also comprise a plurality of regions such as display image 250. For example, display image 250 may be a region that measures 1,280 pixels by 1,024 pixels, which is a typical number of pixels that can be displayed on a standard computer monitor.

One way to store and access the baseline image 80 is to store 30,000 separate and discrete stripes that each comprise 1 pixel by 50,000 pixels. When attempting to present the display image 250, however, each 1 pixel stripe must be read to access the portion of the stripe (if any) that contributes to the display image 250. In this case, 1,024 such buffers must be read, with 1,280 pixels being displayed from each buffer. In total, 51.2 million pixels (50,000×1,024) must be read, and a total of 1.3 million pixels are displayed. The ratio between the amount of imagery data that must be read divided by the amount that is displayed is 40 (51.2/1.3). This ratio provides a measure of the relative inefficiency of viewing imagery data stored as separate and discrete stripes.

An alternative way to store and access the 50,000×30,000 pixel baseline image 80 is to store the entire image as a single file and logically divide the entire image into standard image tiles 114 of, for example, 240 pixels by 240 pixels. The result is a single contiguous baseline image 80 that has been logically divided into standard image tiles 114. It follows that in order to present the display image 250 that corresponds to 1,280×1,024 pixels, only the data corresponding to a maximum of 6×5 standard image tiles, or 1,440 pixels by 1,200 pixels (1.7 MB), needs to be read. In such an embodiment, the ratio between the amount of imagery data that must be read divided by the amount that is displayed is 1.3, resulting in a substantial improvement when using standard image tiles versus separate and discrete image stripes. Advantageously, the TIFF file format and the JPEG2000 compression standard support the organization of large baseline images into standard image tiles 114 in a single convenient file format.

Figure 15:
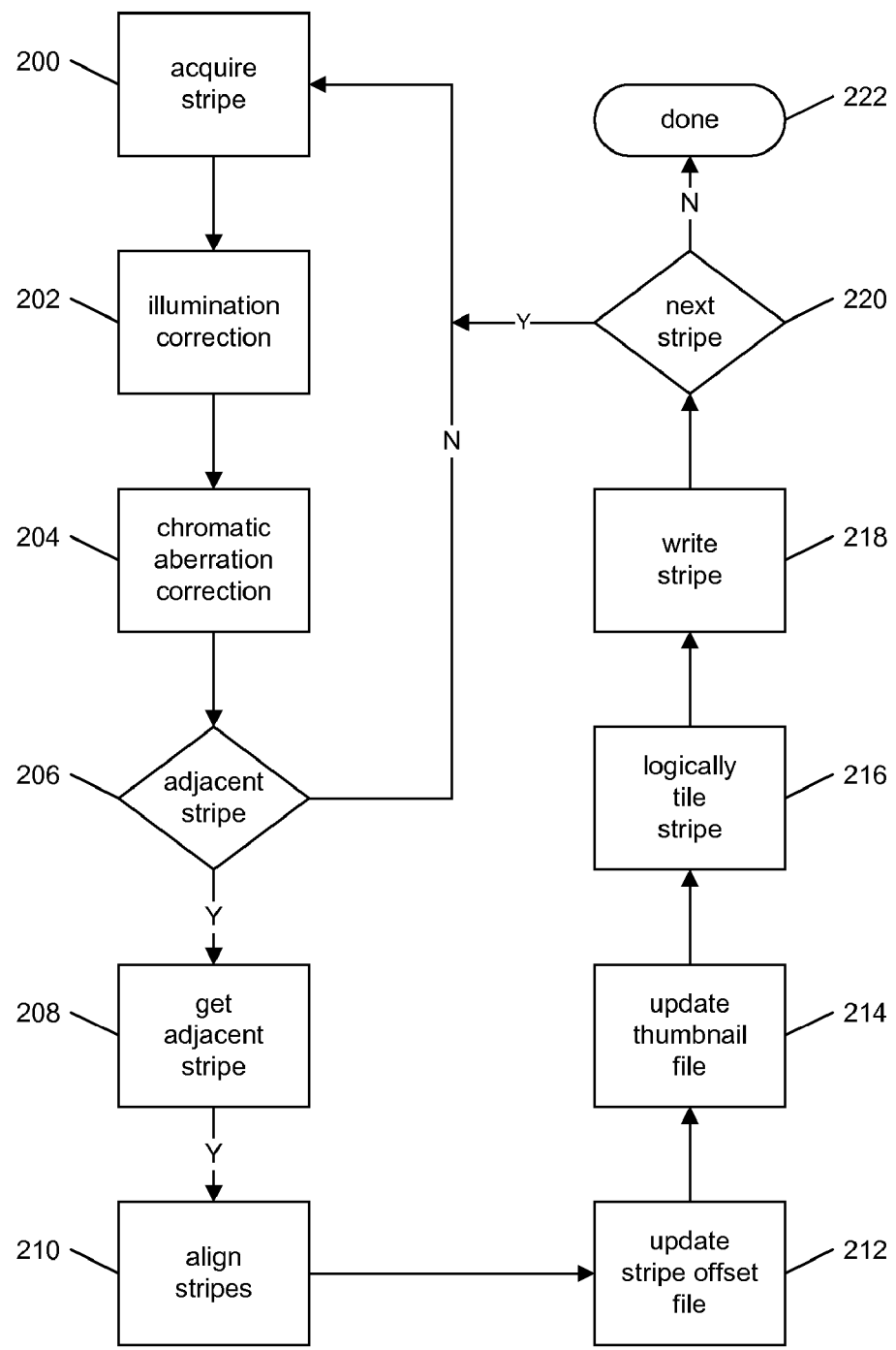
FIG. 15 is a flow diagram illustrating an example process for assembling imagery data stripes into a baseline image according to an embodiment of the present invention.

FIG. 15 is a flow diagram illustrating an example process for assembling image stripes into a baseline image according to an embodiment of the present invention. Initially, in step 200, an image stripe is acquired by the high-resolution line-scanner. An image stripe is acquired one line of data (i.e., one column of pixels) at a time. In one embodiment, all of the stripes required to assemble a baseline image are acquired sequentially. Preferably, the data is captured one line of data at a time and comprises high quality and well-focused imagery data.

The stripe acquisition step preferably employs a synchronization flag to indicate when the line scanner should begin data capture. In one embodiment, the synchronization flag is a hardware trigger from the position encoder that is coupled to the mechanical stage that moves the microscope slide. Employing a coarse alignment technique such as a synchronization flag advantageously ensures that when the line-scanner has completed the acquisition of one stripe and is ready to acquire the next stripe, it can begin stripe acquisition at a proper, efficient, and accurate location.

After stripe acquisition, in step 202 the imagery data is corrected for shading, pixel-to-pixel non-uniformities, and to implement other desirable image enhancements, for example, gamma correction. Preferably, illumination correction is applied one line of data at a time until the entire stripe has been corrected. Illumination may also take place during data capture.

In one embodiment, an illumination correction reference such as that previously described with respect to FIG. 12 can be used to determine the pixel-specific, color-channel-specific adjustments that are applied to the image stripe during illumination correction. Advantageously, the use of an illumination correction look-up-table is extremely fast because the value of an incoming pixel that is part of a stripe is simply exchanged with another value, without the need for more complex time-consuming computations.

Following illumination correction, the stripe is next corrected for chromatic aberrations in step 204. The chromatic aberration correction process is similar to illumination correction in that it also applied to the imagery data one line of data at a time until the entire stripe has been color corrected. Preferably, chromatic aberration correction can take place contemporaneously with data capture and illumination correction.

Once the stripe has undergone chromatic aberration correction, the system determines, in step 206, if a previously captured adjacent stripe is present. In the case where the captured stripe is the first stripe of the baseline image, no adjacent stripe is available and the process returns to step 200 to acquire another stripe. Where the captured stripe is the second or later stripe of the baseline image, the adjacent stripe is then loaded into memory, as illustrated in step 208.

Advantageously, rather than loading the entire adjacent stripe into memory, a smaller subsection of the adjacent stripe can be used instead. For example, in the case of a stripe that comprises 2,000×60,000 pixels, a sub-stripe comprising 40×60,000 pixels can be loaded into memory from the adjacent edge of the previously captured adjacent stripe. Additionally, a second sub-stripe comprising 40×60,000 pixels can be loaded into memory from near the adjacent edge of the captured stripe. The two facing 40 pixel wide sub-stripe regions from the two stripes advantageously provide enough overlap to accurately align the two stripes, which takes place in step 210. This alignment technique advantageously requires significantly less system resources to accurately align adjacent stripes.

The alignment information generated by this process can be accumulated for all stripes that have been aligned and stored in a stripe offset file as x-axis and y-axis pixel offsets, as illustrated in step 212. In one embodiment, the format for each row in the stripe offset file is <filename_n.tif x-offset y-offset> where n is the stripe number, x-offset is the number of pixels by which the adjacent stripes are offset horizontally, and y-offset is the number of pixels by which the adjacent stripes are offset vertically. FIG. 16 is a block diagram illustrating an example stripe offset file according to an embodiment of the present invention. Of course, in an alternative embodiment, the x-offset value can represent the vertical offset while the y-offset value can represent the horizontal offset.

In parallel with aligning the stripes using the sub-stripes, a thumbnail image is extracted from the stripe. When the various thumbnail images for each stripe in the baseline image are combined, they preferably create a thumbnail image for the entire baseline image. Thus, in step 214, the thumbnail image for the captured stripe is updated into the thumbnail image file. Preferably, a typical thumbnail image for the baseline image is 500×300 pixels and can be used by viewing software which accesses the image data directly from the captured stripe files.

In step 216, after the stripes have been aligned and the thumbnail file has been updated, the stripe is logically organized into standard image tiles. These standard image tiles advantageously provide an index into the large baseline image so that various sub-regions of the baseline image can be quickly accessed and viewed by the viewing software. Once the standard image tiles for a stripe have been identified, the stripe can be written to disk or some other data storage device, as shown in step 218.

Alternatively, the standard image tiles may be written to an open TIFF file. In such an embodiment, the standard image tiles are preferably compressed using the JPEG2000 prior to being written to the TIFF file. Additionally, when the standard image files are stored in an open TIFF file, the native stripe can be discarded rather than being written to disk.

If additional stripes are required to capture the entire baseline image, as determined in step 220, the process then returns to step 200 to acquire the next stripe. If the complete baseline image has been captured and no additional stripes are required, then the process is complete and terminates as shown in step 222.

There are three outputs of the flow diagram shown in FIG. 15. First, the various stripes that comprise the baseline image are stored to disk, preferably in TIFF format and logically organized into standard image tiles to support efficient viewing. Second, a thumbnail image of the complete baseline image, preferably in TIFF format. And third, a stripe offset file that provides the alignment offsets for the adjacent stripes that comprise the baseline image.

Alternatively, only a single TIFF file can be created by the process. In such an embodiment, the single TIFF file preferably a baseline image comprising a plurality of JPEG2000 compressed image tiles. Additionally, the single TIFF file may also include various other images at different intermediate resolutions and a thumbnail image, which preferably represents the entire baseline image at a low resolution.

Image Data File Organization

There are at least two optional ways to store a virtual slide. First, the virtual slide can be stored as a single TIFF file including a baseline image and one or more intermediate images at different resolutions, with each image being organized into a plurality of image tiles. Second, the virtual slide can be stored as a set of image stripes in combination with a stripe offset file that provides physical arrangement information for aligning the stripes into a contiguous baseline image.

The storage of image stripes in a single TIFF file including a contiguous baseline image that has been organized into standard image tiles enables the immediate and efficient viewing of the uncompressed baseline image as captured by the line-scanner. The dramatic performance differences in viewing efficiencies highlighted by the example comparing reading discrete one pixel wide stripes versus reading standard image tiles illustrates the importance of properly organizing a virtual slide file. The image data file organization is driven by the desire to efficiently display any user-selected region of the baseline image at any level of zoom (magnification) on a computer monitor.

Figure 17:
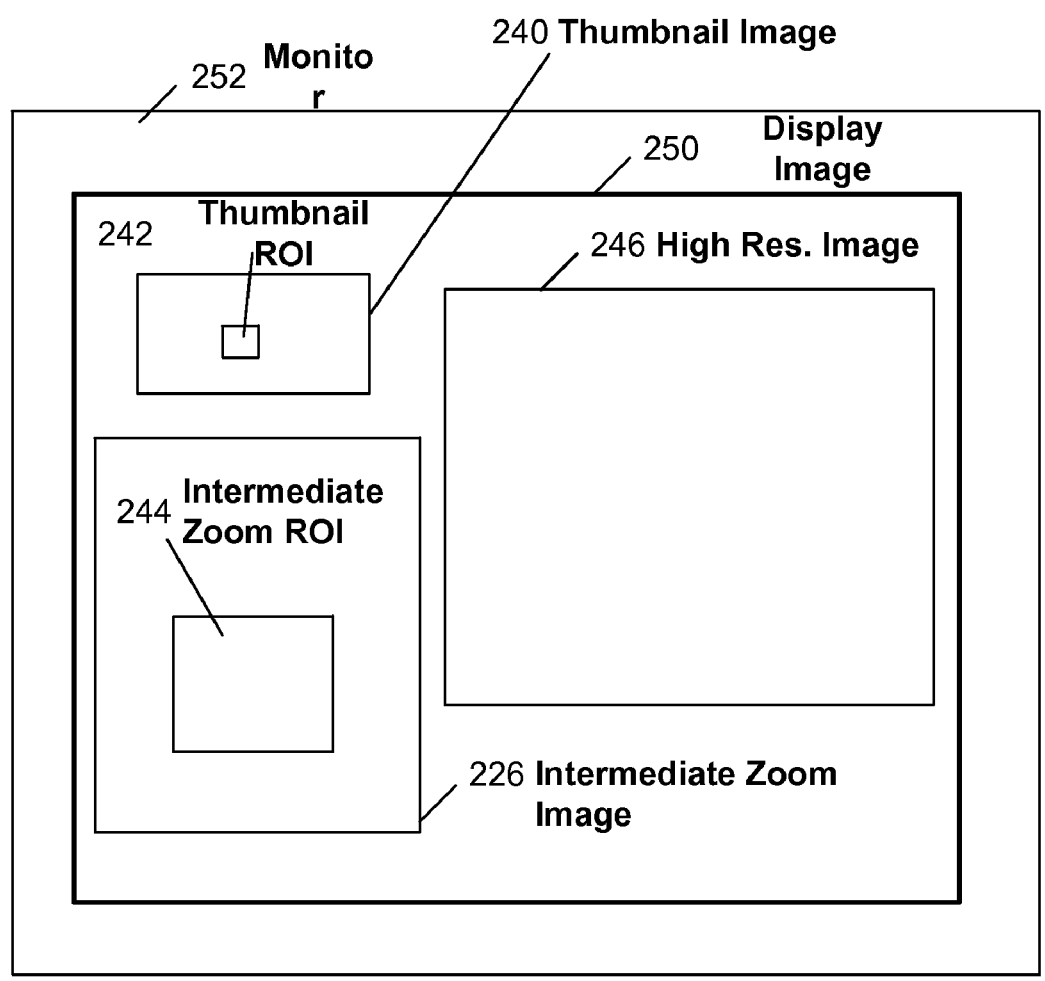
FIG. 17 is a block diagram illustrating an example viewing platform for digitized slide images according to an embodiment of the present invention.

FIG. 17 is a block diagram illustrating an example viewing platform for virtual slides according to an embodiment of the present invention. A display image 250 comprising all of the pixels available at a given display resolution is presented on a monitor 252. The display image 250 is typically comprised of toolbars, text, and one or more of the following images: a thumbnail image 240, an intermediate zoom image 226 and a high resolution image 246 that preferably corresponds to a high-resolution region of interest ("ROI") of a virtual slide. Additionally, the thumbnail image 240 has a thumbnail ROI 242 and the intermediate zoom image 226 has an intermediate zoom image ROI 244.

The thumbnail image 240 represents a very small low-resolution image of the entire slide, providing only macroscopic details. The thumbnail image 240 can be the same thumbnail file that is generated during the previously described image assembly process. The intermediate zoom image 226 preferably corresponds approximately to what can be observed through a conventional microscope at low optical magnification, typically using an objective lens with 2×(times two) magnification.

The high resolution image 246 typically corresponds to the native resolution of the baseline image, and is intended to correlate with the resolution of imagery data that can be observed through a conventional microscope at high optical magnifications, typically using objective lenses with 20× or 40× magnification, or higher.

It is clear that there need not be any fixed resolution for any of these three images, nor is it necessary that all three images be displayed simultaneously in the display image 250. There are also many ways to organize, size and display these and other relevant images to make the viewing of virtual slides on a display monitor as efficient as possible. The challenge for the image file organization is to support such applications efficiently. The method of logically indexing a baseline image (derived from a plurality of aligned stripes) into standard image tiles makes it dramatically more efficient to access imagery data at the full resolution of the baseline image.

An image that is logically divided into standard image tiles is relatively easy to pan at its native 1:1 resolution, as it is necessary only to display incremental standard image tiles. However, even with the benefits of the standard image tiles, panning at lower resolutions than the 1:1 resolution of the baseline image is difficult. For example, panning an intermediate zoom image 226 that represents $1/100$ the amount of imagery data available in the baseline image is very difficult—even when working with a relatively small number of stripes that have been organized into standard image tiles. Panning at this resolution requires opening a large number of stripes to gain access to the various standard image tiles of the baseline image that are required to display the proportionately larger area (at lower resolution) of the intermediate zoom image 226.

In this example, 100 times as many standard image tiles must be accessed and sub-sampled to extract the appropriate pixels needed to update the intermediate zoom image 226. The disk access and processing overhead required to open the various standard image tiles and sub-sample such a large number of standard image tiles may result in unacceptable performance for any viewing software.

Figure 18:
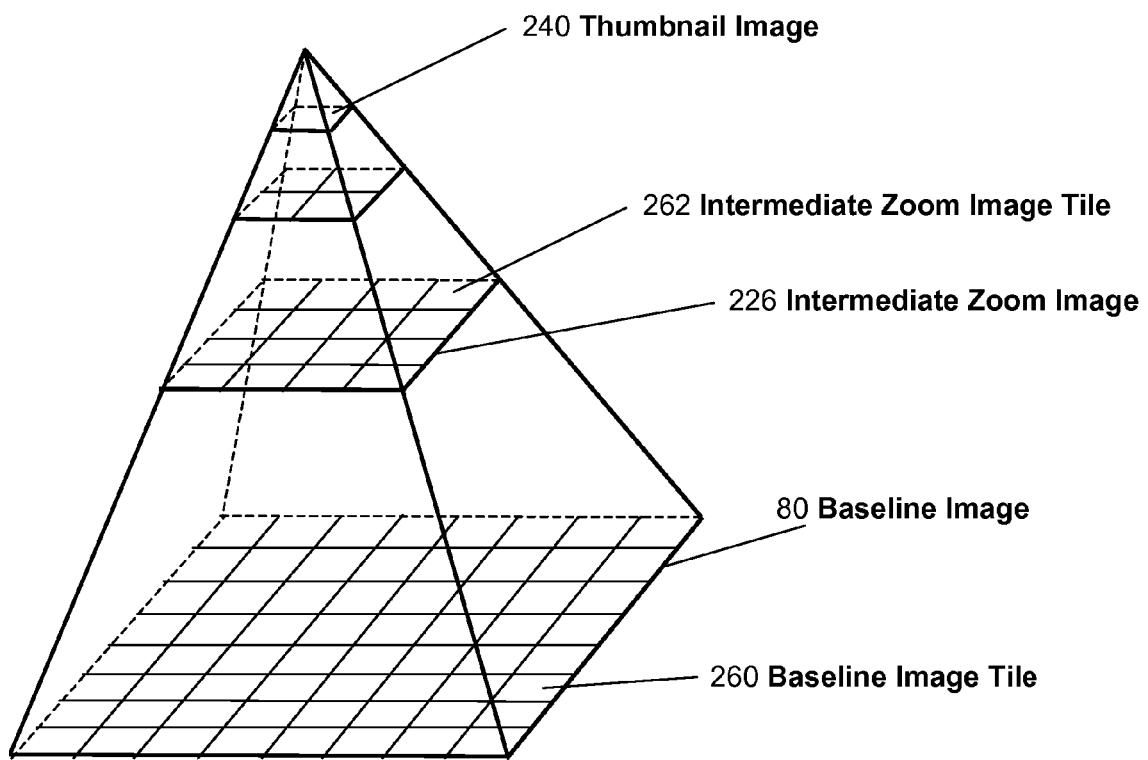
FIG. 18 is a block diagram illustrating an example image file structured to enable efficient viewing of digitized slide images according to an embodiment of the present invention.

FIG. 18 is a block diagram illustrating an example virtual slide image file structured to enable efficient viewing according to an embodiment of the present invention. Advantageously, the organization of virtual slides into pyramids with levels of varying resolutions facilitates rapid zooming and panning by specialized viewing and processing software.

At the base of the pyramid is a baseline image 80 that is logically divided into baseline standard image tiles 260. Each baseline standard image tile 260 represents one 240×240 pixel region of the baseline image 80. A pyramid of lower resolution images is created from the baseline image via straight-line averaging of the pixels in the baseline image. These lower resolution images are themselves logically organized and indexed into intermediate zoom standard image tiles 262 at the same 240×240 pixel size. Advantageously, there can be one or more levels of intermediate zoom images 226 in the pyramid at any desired sub-sampling interval. At the top of the pyramid is preferably the thumbnail image 240, which is not organized into standard image tiles. Preferably, the aspect ratio of the thumbnail image 240 is the same as the aspect ratio of the baseline image 80.

In the illustrated embodiment, the dimension of the thumbnail image 240 is preferably 240×240 pixels. Not counting the thumbnail image 240 or the baseline image 80, the illustrated image pyramid has only two levels. The first level is the intermediate zoom image 226 and is logically divided into 4×4 intermediate zoom standard image tiles 262, or 960×960 pixels. The second intermediate level is logically divided into 2×2 standard image tiles, or 480×480 pixels. The baseline image 80 is logically divided into 8×8 standard image tiles 260, or 1,920×1,920 pixels. Advantageously, the two intermediate level images respectively represent sub-sampling ratios of 2:1 and 4:1 with respect to the baseline image 80 and correspond to an incremental image size that is 31.26% larger than the baseline image alone (¼+ 1/16).

The following table summarizes this simplified example.

TABLE 1

| Image | Ratio | Width | Height | Tile size | Raw size | Size % |
|---|---|---|---|---|---|---|
| Base | 1:1 | 1,920 | 1,920 | 240 × 240 | 10.8 MB | 100.00% |
| level 1 | 2:1 | 960 | 960 | 240 × 240 | 2.64 MB | +25.00% |
| level 2 | 4:1 | 480 | 480 | 240 × 240 | 0.66 MB | +6.25% |
| Thumbnail | 8:1 | 240 | 240 | no tiles | .16 MB | +.01% |
| | | | | Total | 14.26 MB | +131.26% |

The concept of creating lower level pyramids at levels corresponding to 2:1, 4:1, 16:1, 32:1, 64:1, etc. will be understood by those having ordinary skill in the art. For example, the well-known flashpix ("FPX") format utilizes a pyramid format using progressively lower resolution images that are based on the JPEG format. The compression achievable with JPEG is limited to about 10:1 for microscopy images. Given that the flashpix pyramid approach increases the final image files by 33% (¼+⅛+ 1/16+ 1/32+ 1/64+ . . . =⅓), the best overall result is an approximately 8:1 compression. This level of compression is not practical when dealing with multi-gigabyte images. Additional limitations of flashpix are that imagery data are only available at the specific sub-sampling levels, continuous zooming is not supported, and the maximum file size is limited to 2 GB for the total of all the images in the pyramid.

The pyramid approach adopted in one embodiment of the present invention differs from the flashpix approach in the following ways: (1) compression is based on the JPEG 2000 standard; (2) the number of intermediate levels is greatly reduced; (3) continuous zoom is possible; and (4) virtual slide size is practically unlimited. The following table illustrates the relative ratios of the intermediate level images that are created for a virtual slide with a baseline image 80 comprising 56 GB of data.

TABLE 2

| Image | Ratio | Width | Height | Tile size | Data size | Size % |
|---|---|---|---|---|---|---|
| Base | 1:1 | 200,000 | 100,000 | 240 × 240 | 57,220 MB | 100.00% |
| level 1 | 4:1 | 50,000 | 25,000 | 240 × 240 | 3,576 MB | +6.25% |
| level 2 | 12:1 | 16,666 | 8,333 | 240 × 240 | 397.3 MB | +.69% |
| level 3 | 36:1 | 5,555 | 2,777 | 240 × 240 | 44.13 MB | +.08% |
| level 4 | 108:1 | 1,851 | 925 | 240 × 240 | 4.89 MB | +.01% |
| Thumbnail | 391:1 | 512 | 256 | no tiles | .38 MB | +.00% |
| | | | | Total | 61,242.7 MB | 107.03% |

It is noteworthy that the 240×240 pixel standard image tiles size is not arbitrary. The standard image tile size is selected to facilitate integer sub-sampling of intermediate level images at either 3:1 or 4:1 ratios. Another preferred standard image tile size is 256 ×256 pixels.

JPEG2000 is a standard for image compression which uses wavelet technology and does not suffer from the block artifacts commonly observed in JPG compressed images. JPEG2000 technology involves sampling an image at successively lower and lower frequencies (e.g., powers of 2). The frequency data can be used to reconstruct the image at different resolutions which are down-sampled by powers of 2 from the original image. Resolution levels between powers of 2 are synthesized by interpolating (e.g., down-sampling) from the next larger available level.

In one embodiment, as shown in TABLE 2, the thumbnail ratio represents less than 1% of the baseline image. The spacing between levels is much larger than 2:1, which has the benefit of adding only 7% to the size of the baseline image. Since all image quadrants are compressed using the JPEG2000 compression standard, much higher compression ratios are achievable. For example, using a ⅞ wavelet filter scheme with a quality of 30, compression ratios of 50:1 have been found to be acceptable for many microscopy images. Adding 7% for the additional pyramid levels still yields an overall compression of about 45:1.

Furthermore, because each standard image tile 260 is itself a compressed JPEG2000 image each baseline standard image tile 260 may advantageously have its own JPEG2000 pyramid structure available at no additional cost in size because of the inherent pyramid structure within JPEG2000. The internal pyramid structure of JPEG2000 also makes it possible to generate intermediate resolution images by interpolating from the closest level in the pyramid.

Because the pyramid scheme involves multiple layers of images (e.g., baseline, intermediate, and thumbnail), the preferred file format will allow multiple images to be stored together. The Tagged Image File Format ("TIFF") provides just such a capability. TIFF additionally provides other attractive characteristics including: (i) it is a non-proprietary public standard; (ii) it is generally available with efficient open-source implementation (e.g., libtiff); (iii) it supports various image organizations, including standard image tiles; (iv) it supports various image characteristics such as the number of color channels, the bit size of samples in color channels, and color space (RGB, YCC, HSV, etc.); (v) it supports various compression technologies, including those implemented externally from the file access method; (vi) it supports arbitrarily large images; and (vii) it supports storage of application-specific indicative data in image files.

In one embodiment, a TIFF file is used as the file type for a virtual slide. For example, the first image in the TIFF file can be the baseline image 80 followed by the thumbnail image 240 and then followed by the intermediate level images 226 in the pyramid. There can be more than one intermediate level image. The baseline image 80 and intermediate level images 226 are logically organized into standard image tiles such as baseline image tiles 260 and each standard image tile is preferably compressed, for example with JPEG2000.

Figure 19:
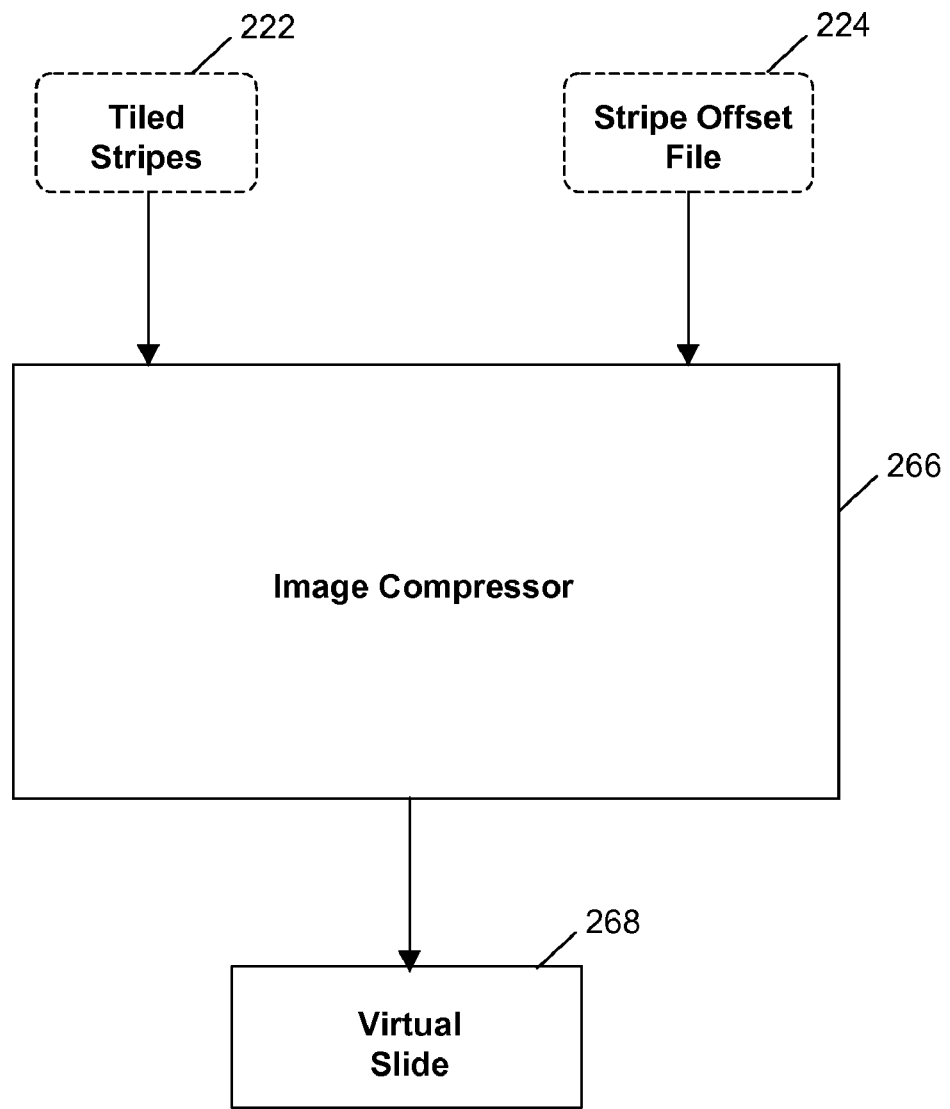
FIG. 19 is a block diagram illustrating an example image compressor for generating a digitized slide image according to the present invention.

FIG. 19 is a block diagram illustrating an example image compressor 266 for generating a virtual slide 268 according to an embodiment of the present invention. The input to the image compressor 266 includes the stripes 222 that have been logically organized into standard image tiles and preferably saved in TIFF format and the stripe offset file 228. Note that a thumbnail file is not required to create a virtual slide 268. Rather, the image compressor 266 can create a thumbnail image by down-sampling the baseline image as the virtual slide is created.

In one embodiment, the image compressor 266 is a software program that is an ActiveX control that is used to create and compress the pyramid levels that constitute a virtual slide 268 and also to crop, scale, rotate and enhance image files. Specific features of the image compressor 266 may include: (i) support for TIFF input files with various compression schemes (raw, LZW lossless, JPEG lossy, and JPEG2000 lossy) and organizations (raster, stripped, tiled); (ii) support for compound input files; (iii) ability to generate TIFF output files with various compression schemes (raw, LZW lossless, and JPEG2000 lossy) and configurable tile size; (iv) ability to optionally generate a thumbnail image of specified dimensions (stored in output TIFF file as a separate image); (v) ability to optionally generate one or more intermediate resolution images spaced at certain specified intervals between the baseline image and the thumbnail image and stored in output TIFF file as third, fourth, etc. images; (vi) support for large images (e.g., 200,000 pixels in width and height); and (vii) support for high-fidelity scaling routines for down-sampling or up-sampling images to desired dimensions.

With respect to item (ii), a compound file is a text file (e.g., .txt) that describes a mosaic of image files that are combined to form the source image. Each line in the text file contains an image filename and the X and Y offsets within the compound image at which the image is positioned. For example, the stripe offset table shown in FIG. 16 is a compound file.

In another embodiment, the image compressor 266 creates a blank TIFF file and receives only the standard image tiles from the captured stripes. These tiles are then placed in the TIFF file and organized into the baseline image. Additional intermediate zoom level images may also be created and placed in the TIFF file along with a thumbnail image that tops off the virtual slide 268.

In order to improve virtual slide processing times, dedicated hardware to accelerate image processing may be used. In this context hardware refers to an external subsystem of the control computer that is dedicated to this processing. In particular, the term hardware contemplates the fact that modern hardware actually consists of some combination of hardware, memory, and software.

Some of the image processing steps may be performed in the line-scan camera interface board/frame grabber as image stripes are acquired. In fact, it is conceivable that all image processing be performed in the frame grabber, automatically yielding compressed standard image tiles for the baseline and all intermediate level images, as well a thumbnail image. It is also possible to perform some image processing steps in the frame grabber, perform other image processing steps in the control computer's software, and then use other hardware (not the frame grabber) to perform the final compression, which is the most computation-intensive step. A preferred method of compressing imagery data from the linear-array-based scanner is a processing board with modular processing elements, such that, as more processing elements are added, faster data compression is achieved.

Another embodiment may take advantage of the availability of relatively inexpensive multiprocessor computers. In this implementation, one processor can be used for data acquisition, interfacing to the capture device, and performing adjustment processing such as illumination correction and chromatic aberration correction. A second processor can be used to perform the image compressor tasks, in parallel with data acquisition. This embodiment advantageously provides captured stripes directly from the acquisition process to the compression and organization process without intermediate storage to disk. As the discussion above illustrates, the captured stripes are large, particularly prior to compression, and hence the disk I/O overhead required to write and read back these stripes is significant. Such an embodiment would therefore enable access to the fully organized virtual slides more quickly, providing significant benefit to many applications, including applications such as telemicroscopy where it is often desirable to quickly share a virtual slide through a network.

Virtual Slide System Components

Figure 20:
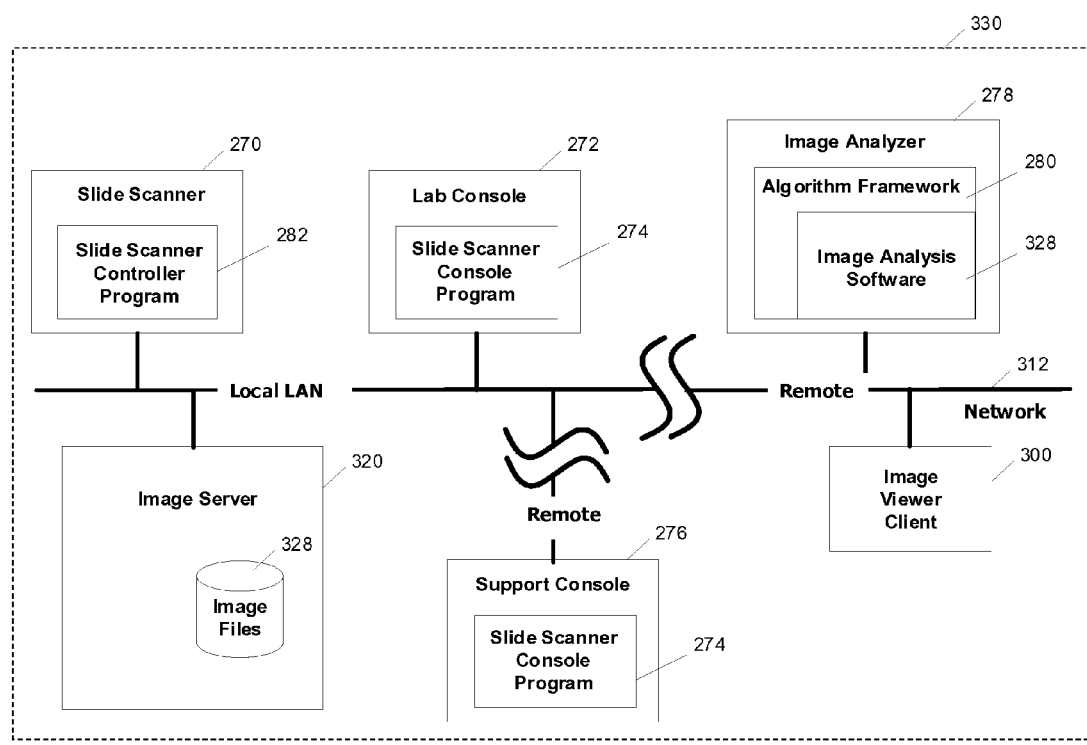
FIG. 20 is a block diagram illustrating an example system for data management of digitized slide images according to an embodiment of the present invention.

FIG. 20 is a block diagram illustrating an example system for data management of virtual slides according to an embodiment of the present invention. The overall slide scanning system 330 comprises several components, including a slide scanner 270, a lab console 272, a support console 276, an image analyzer 278, an image viewer client 300, and an image server 320. In the illustrated embodiment, the various components are communicatively coupled over a network 312. Alternatively some of the components may be combined in a single discrete hardware component that houses the combined components. For example, the image server 320 and image analyzer 278 may be combined. In such an embodiment, the combined components may communicate through inter-process communications (e.g., pipes, swap files, etc.) rather than communicate over the network 312.

Network 312 may be a local network or LAN, a WAN, wireless network or other type of communication network, including the internet Preferably, network 312 provides sufficient bandwidth to support the efficient and fast transfer of large amounts of data, such as the data associated with linear-array-based microscope slide scanner images.

Furthermore, the slide scanner 270 preferably includes a slide scanner controller program 282. The image server 320 preferably stores virtual slides in a data storage area such as the image files 328, the virtual slides being created by the slide scanner 270. The image viewer client 300 is preferably configured to communicate with the image server 320 to allow the remote viewing of virtual slides. Additionally, the laboratory console 272 preferably controls one or more slide scanners 270, for example through the use of a slide scanner console program 274 Similarly, a support console 276 may provide control for one or more remote slide scanners 270 using the same slide scanner console program 274. Finally, the image analyzer 278 preferably includes an algorithm framework 280 and image analysis software 328 and provides a means for analyzing, processing and compressing virtual slides. The algorithm framework 280 makes it straightforward to apply traditional image analysis software and algorithms to a multi-gigabyte virtual slide.

In one embodiment, the slide scanner 270 preferably has dedicated computer hardware to provide the processing power for scanning a microscope slide and creating the virtual slide. The other components of the slide scanning system 330, namely the image server 320, the lab console 272, the support console 276, the image analyzer support console 276, the image analyzer 278 and the image viewer client 300 can all be integrated into a single computer, or distributed on multiple computers as needed.

Figure 21:
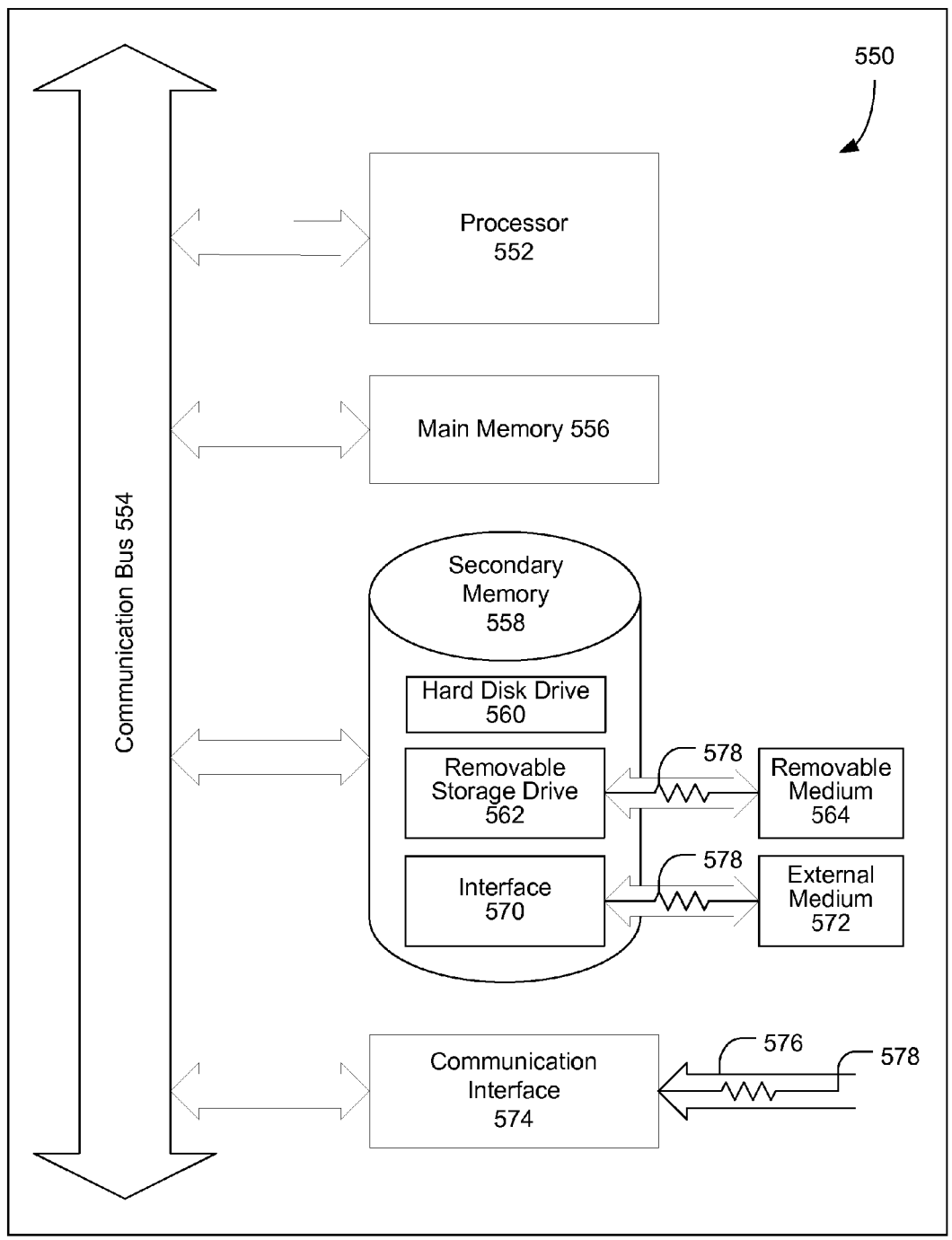
FIG. 21 is a block diagram illustrating an exemplary computer system that may be used in connection with the various embodiments described herein.

FIG. 21 is a block diagram illustrating an exemplary computer system 550 that may be used in connection with the various embodiments described herein. For example, the computer system 550 may be used in conjunction with the linear-array-based microscope slide scanner, an image server, a lab console or support console, an image analyzer, or an image viewer client. The computer system 550 may also be used as a separate system to perform certain computationally intense procedures or steps, for example compression of the virtual slides. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

Figure 22:
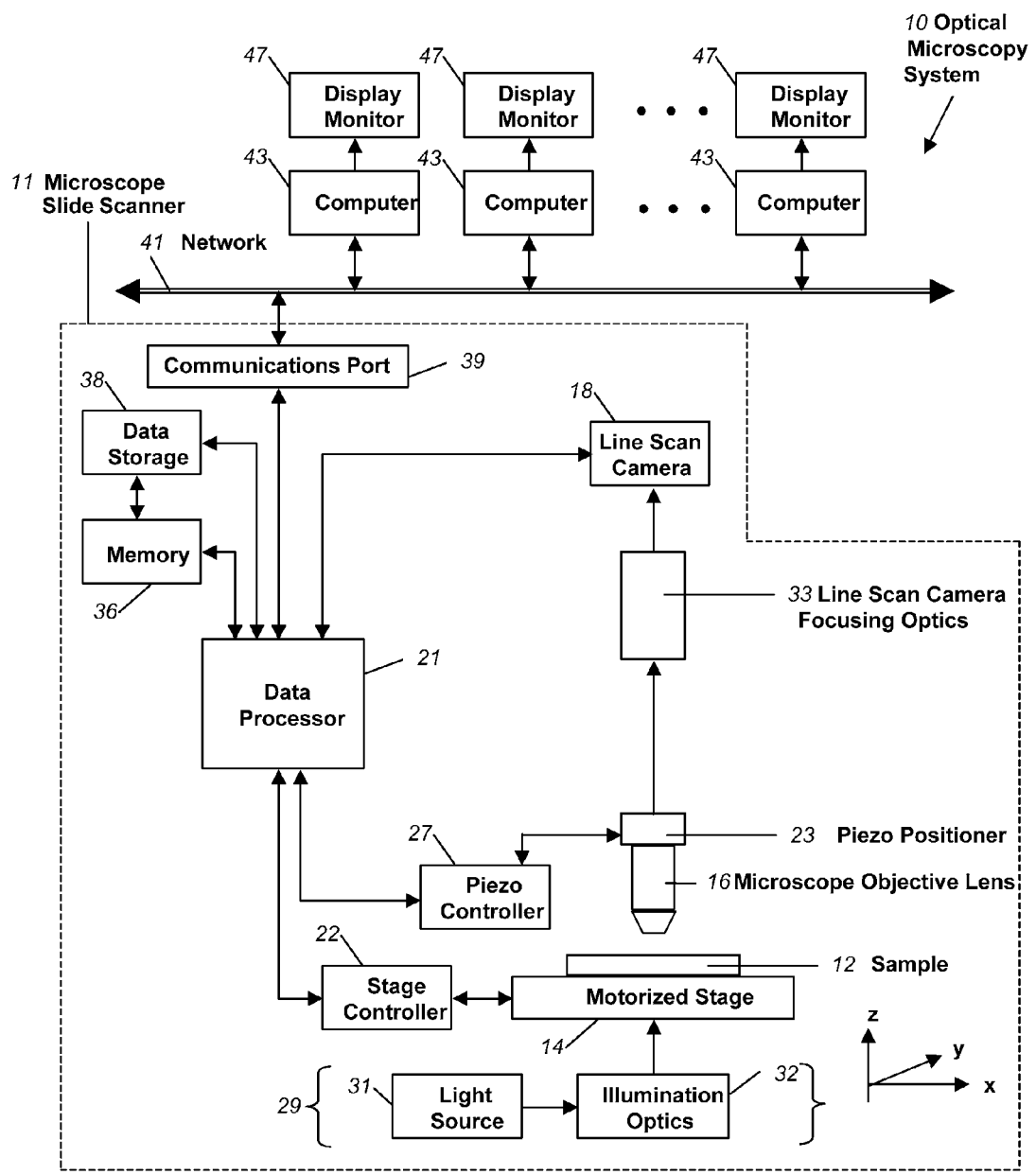
FIG. 22 is a block diagram of a preferred embodiment of an optical microscopy system according to the present invention.

Turning now to FIG. 22, a block diagram of a preferred embodiment of an optical microscopy system 10 according to the present invention is shown. The heart of the system 10 is a microscope slide scanner 11 that serves to scan and digitize a specimen or sample 12. The sample 12 can be anything that may be interrogated by optical microscopy. For instance, the sample 12 may be a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 12 may also be an array of any type of DNA or DNA-related material such as cDNA or RNA or protein that is deposited on any type of slide or other substrate, including any and all samples commonly known as a microarray. The sample 12 may be a microtiter plate, for example a 96-well plate. Other examples of the sample 12 include integrated circuit boards, electrophoresis records, petri dishes, film, semiconductor materials, forensic materials, or machined parts.

The scanner 11 includes a motorized stage 14, a microscope objective lens 16, a line scan camera 18, and a data processor 21. The sample 12 is positioned on the motorized stage 14 for scanning. The motorized stage 14 is connected to a stage controller 22 which is connected in turn to the data processor 21. The data processor 21 determines the position of the sample 12 on the motorized stage 14 via the stage controller 22. In the presently preferred embodiment, the motorized stage 14 moves the sample 12 in at least the two axes (x/y) that are in the plane of the sample 12. Fine movements of the sample 12 along the optical z-axis may also be necessary for certain applications of the scanner 11, for example, for focus control. Z-axis movement is preferably accomplished with a piezo positioner 23, such as the PIFOC from Polytec P1 or the MIPOS 3 from Piezosystem Jena. The piezo positioner 23 is attached directly to the microscope objective 16 and is connected to and directed by the data processor 21 via a piezo controller 27. A means of providing a coarse focus adjustment may also be needed and can be provided by z-axis movement as part of the motorized stage 14 or a manual rack-and-pinion coarse focus adjustment (not shown).

In the presently preferred embodiment, the motorized stage 14 includes a high precision positioning table with ball bearing linear ways to provide smooth motion and excellent straight line and flatness accuracy. For example, the motorized stage 14 could include two Daedal model 106004 tables stacked one on top of the other. Other types of motorized stages 14 are also suitable for the scanner 11, including stacked single axis stages based on ways other than ball bearings, single- or multiple-axis positioning stages that are open in the center and are particularly suitable for transillumination from below the sample, or larger stages that can support a plurality of samples. In the presently preferred embodiment, motorized stage 14 includes two stacked single-axis positioning tables, each coupled to two millimeter leadscrews and Nema-23 stepping motors. At the maximum lead screw speed of twenty-five revolutions per second, the maximum speed of the sample 12 on the motorized stage 14 is fifty millimeters per second. Selection of a lead screw with larger diameter, for example five millimeters, can increase the maximum speed to more than 100 millimeters per second. The motorized stage 14 can be equipped with mechanical or optical position encoders which has the disadvantage of adding significant expense to the system. Consequently, the presently preferred embodiment does not include position encoders. However, if one were to use servo motors in place of stepping motors, then one would have to use position feedback for proper control.

Position commands from the data processor 21 are converted to motor current or voltage commands in the stage controller 22. In the presently preferred embodiment, the stage controller 22 includes a 2-axis servo/stepper motor controller (Compumotor 61K2) and two 4-amp microstepping drives (Compumotor OEMZL4). Microstepping provides a means for commanding the stepper motor in much smaller increments than the relatively large single 1.8 degree motor step. For example, at a microstep of 100, the sample 12 can be commanded to move at steps as small as 0.1 micrometer. A microstep of 25,000 is used in the presently preferred embodiment of this invention. Smaller step sizes are also possible. It should be obvious that the optimum selection of the motorized stage 14 and the stage controller 22 depends on many factors, including the nature of the sample 12, the desired time for sample digitization, and the desired resolution of the resulting digital image of the sample 12.

The microscope objective lens 16 can be any microscope objective lens commonly available. One of ordinary skill in the art will realize that the choice of which objective lens to use will depend on the particular circumstances. In the preferred embodiment of the present invention, the microscope objective lens 16 is of the infinity-corrected type.

The sample 12 is illuminated by an illumination system 29 that includes a light source 31 and illumination optics 32. The light source 31 in the presently preferred embodiment includes a variable intensity halogen light source with a concave reflective mirror to maximize light output and a KG-1 filter to suppress heat. However, the light source 31 could also be any other type of arc-lamp, laser, or other source of light. The illumination optics 32 in the presently preferred embodiment include a standard Köhler illumination system with two conjugate planes that are orthogonal to the optical axis. The illumination optics 32 are representative of the bright-field illumination optics that can be found on most commercially available compound microscopes sold by companies such as Carl Zeiss, Nikon, Olympus, or Leica. One set of conjugate planes includes (i) a field iris aperture illuminated by the light source 31, (ii) the object plane that is defined by the focal plane of the sample 12, and (iii) the plane containing the light-responsive elements of the line scan camera 18. A second conjugate plane includes (i) the filament of the bulb that is part of the light source 31, (ii) the aperture of a condenser iris that sits immediately before the condenser optics that are part of the illumination optics 32, and (iii) the back focal plane of the microscope objective lens 16. In the presently preferred embodiment, the sample 12 is illuminated and imaged in transmission mode, with the line scan camera 18 sensing optical energy that is transmitted by the sample 12, or conversely, optical energy that is absorbed by the sample 12.

The scanner 11 of the present invention is equally suitable for detecting optical energy that is reflected from the sample 12, in which case the light source 31, the illumination optics 32, and the microscope objective lens 16 must be selected based on compatibility with reflection imaging. One possible embodiment may therefore be illumination through a fiber optic bundle that is positioned above the sample 12. Other possibilities include excitation that is spectrally conditioned by a monochromator. If the microscope objective lens 16 is selected to be compatible with phase-contrast microscopy, then the incorporation of at least one phase stop in the condenser optics that are part of the illumination optics 32 will enable the scanner 11 to be used for phase contrast microscopy. To one of ordinary skill in the art, the modifications required for other types of microscopy such as differential interference contrast and confocal microscopy should be readily apparent. Overall, the scanner 11 is suitable, with appropriate but well-known modifications, for the interrogation of microscopic samples in any known mode of optical microscopy.

Between the microscope objective lens 16 and the line scan camera 18 are situated the line scan camera focusing optics 33 that focus the optical signal captured by the microscope objective lens 16 onto the light-responsive elements of the line scan camera 18. In a modern infinity-corrected microscope the focusing optics between the microscope objective lens and the eyepiece optics, or between the microscope objective lens and an external imaging port, consist of an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from the sample 12 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

The line scan camera focusing optics 33 include a tube lens optic mounted inside of a mechanical tube. Since the scanner 11, in its preferred embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since the scanner 11 also overcomes the field of view limitation of a traditional microscope by providing a field of view that is practically limited only by the physical boundaries of the sample 12, the importance of magnification in an all-digital imaging microscope such as provided by the present scanner 11 is limited. Once a portion of the sample 12 has been digitized, it is straightforward to apply electronic magnification, sometimes known as electric zoom, to an image of the sample 12 in order to increase its magnification. Increasing the magnification of an image electronically has the effect of increasing the size of that image on the monitor that is used to display the image. If too much electronic zoom is applied, then the display monitor will be able to show only portions of the magnified image. It is not possible, however, to use electronic magnification to display information that was not present in the original optical signal that was digitized in the first place. Since one of the objectives of the scanner 11 is to provide high quality digital images, in lieu of visual observation through the eyepieces of a microscope, it is important that the content of the images acquired by the scanner 11 include as much image detail as possible. The term resolution is typically used to describe such image detail and the term diffraction-limited is used to describe the wavelength-limited maximum spatial detail available in an optical signal. The scanner 11 provides diffraction- limited digital imaging by selection of a tube lens focal length that is matched according to the well know Nyquist sampling criteria to both the size of an individual pixel element in a light-sensing camera such as the line scan camera 18 and to the numerical aperture of the microscope objective lens 16. It is well known that numerical aperture, not magnification, is the resolution-limiting attribute of a microscope objective lens 16.

An example will help to illustrate the optimum selection of a tube lens focal length that is part of the line scan camera focusing optics 33. Consider again the 20× microscope objective lens 16 with 9 millimeter focal length discussed previously and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that the line scan camera 18, which in its preferred embodiment has a plurality of 14 micrometer square pixels, is used to detect a portion of the sample 12. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. The line scan focusing optics 33 with a tube lens optic having a focal length of 420 millimeters will therefore be capable of acquiring images with the best possible spatial resolution, similar to what would be observed by viewing a specimen under a microscope using the same 20× objective lens. To reiterate, the scanner 11 utilizes a traditional 20× microscope objective lens 16 in a higher magnification optical configuration, in this example about 47×, in order to acquire diffraction-limited digital images. If a traditional 20× magnification objective lens 16 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. The line scan camera focusing optics 33 are modular elements of the scanner 11 and can be interchanged as necessary for optimum digital imaging. The advantage of diffraction-limited digital imaging is particularly significant for applications, for example bright field microscopy, in which the reduction SNR that is in proportion to the square-root of the number of integration stages. TDI arrays can comprise multiple stages of linear arrays. TDI arrays are available with 24, 32, 48, 64, 96, or even more stages. The scanner 11 also supports linear arrays that are manufactured in a variety of formats including some with 512 pixels, some with 1024 pixels, and others having as many as 4096 pixels. Appropriate, but well known, modifications to the illumination system 29 and the line scan camera focusing optics 33 may be required to accommodate larger arrays. Linear arrays with a variety of pixel sizes can also be used in scanner 11. The salient requirement for the selection of any type of line scan camera 18 is that the sample 12 can be in motion with respect to the line scan camera 18 during the digitization of the sample 12 in order to obtain high quality images, overcoming the static requirements of the conventional imaging tiling approaches known in the prior art.

The output signal of the line scan camera 18 is connected to the data processor 21. The data processor 21 in the presently preferred embodiment includes a central processing unit with ancillary electronics, for example a motherboard, to support at least one signal digitizing electronics board such as an imaging board or a frame grabber. In the presently preferred embodiment, the imaging board is an EPIX PIXCID24 PCI bus imaging board, however, there are many other types of imaging boards or frame grabbers from a variety of manufacturers which could be used in place of the EPIX board. An alternate embodiment could be a line scan camera that uses an interface such as IEEE 1394, also known as Firewire, to bypass the imaging board altogether and store data directly on a data storage 38, such as a hard disk.

The data processor 21 is also connected to a memory 36, such as random access memory (RAM), for the short-term storage of data, and to the data storage 38, such as a hard drive, for long-term data storage. Further, the data processor 21 is connected to a communications port 39 that is connected to a network 41 such as a local area network (LAN), a wide area network (WAN), a metropolitan area network (MAN), an intranet, an extranet, or the global Internet. The memory 36 and the data storage 38 are also connected to each other. The data processor 21 is also capable of executing computer programs, in the form of software, to control critical elements of the scanner 11 such as the line scan camera 18 and the stage controller 22, or for a variety of image-processing functions, image-analysis functions, or networking. The data processor 21 can be based on any operating system, including operating systems such as Windows, Linux, OS/2, Mac OS, and Unix. In the presently preferred embodiment, the data processor 21 operates based on the Windows NT operating system.

The data processor 21, memory 36, data storage 38, and communication port 39 are each elements that can be found in a conventional computer. One example would be a personal computer such as a Dell Dimension XPS T500 that features a Pentium III 500 MHz processor and up to 756 megabytes (MB) of RAM. In the presently preferred embodiment, the computer, elements which include the data processor 21, memory 36, data storage 38, and communications port 39 are all internal to the scanner 11, so that the only connection of the scanner 11 to the other elements of the system 10 is the communication port 39. In an alternate embodiment of the scanner 11, the computer elements would be external to the scanner 11 with a corresponding connection between the computer elements and the scanner 11.

The scanner 11, in the presently preferred embodiment of the invention, integrates optical microscopy, digital imaging, motorized sample positioning, computing, and network-based communications into a single-enclosure unit. The major advantage of packaging the scanner 11 as a single-enclosure unit with the communications port 39 as the primary means of data input and output are reduced complexity and increased reliability. The various elements of the scanner 11 are optimized to work together, in sharp contrast to traditional microscope-based imaging systems in which the microscope, light source, motorized stage, camera, and computer are typically provided by different vendors and require substantial integration and maintenance.

The communication port 39 provides a means for rapid communications with the other elements of the system 10, including the network 41. The presently preferred communications protocol for the communications port 39 is a carrier-sense multiple-access collision detection protocol such as Ethernet, together with the TCP/IP protocol for transmission control and internetworking. The scanner 11 is intended to work with any type of transmission media, including broadband, baseband, coaxial cable, twisted pair, fiber optics, DSL or wireless.

In the presently preferred embodiment, control of the scanner 11 and review of the imagery data captured by the scanner 11 are performed on a computer 43 that is connected to the network 41. The computer 43, in its presently preferred embodiment, is connected to a display monitor 47 to provide imagery information to an operator. A plurality of computers 43 may be connected to the network 41. In the presently preferred embodiment, the computer 43 communicates with the scanner 11 using a network browser such as Internet Explorer from Microsoft or Netscape Communicator from AOL. Images are stored on the scanner 11 in a common compressed format such a JPEG which is an image format that is compatible with standard image-decompression methods that are already built into most commercial browsers. Other standard or non-standard, lossy or lossless, image compression formats will also work. In the presently preferred embodiment, the scanner 11 is a webserver providing an operator interface that is based on webpages that are sent from the scanner 11 to the computer 43. For dynamic review of imagery data, the currently preferred embodiment of the scanner 11 is based on playing back, for review on the display monitor 47 that is connected to the computer 43, multiple frames of imagery data using standard multiple-frame browser compatible software packages such as Media-Player from Microsoft, Quicktime from Apple Computer, or Real-Player from Real Networks. In the presently preferred embodiment, the browser on the computer 43 uses the hypertext transmission protocol (http) together with TCP for transmission control.

There are, and will be in the future, many different means and protocols by which the scanner 11 could communicate with the computer 43, or a plurality of computers. While the presently preferred embodiment is based on standard means and protocols, the approach of developing one or multiple customized software modules known as applets is equally feasible and may be desirable for selected future applications of the scanner 11. Further, there are no constraints that computer 43 be of any specific type such as a personal computer (PC) or be manufactured by any specific company such as Dell. One of the advantages of a standardized communications port 39 is that any type of computer 43 operating common network browser software can communicate with the scanner 11.

If one so desires, it is possible, with some modifications to the scanner 11, to obtain spectrally resolved images. Spectrally resolved images are images in which spectral information is measured at every image pixel. Spectrally resolved images could be obtained by replacing the line scan camera 18 of the scanner 11 with an optical slit and an imaging spectrograph. The imaging spectrograph uses a two-dimensional CCD detector to capture wavelength-specific intensity data for a colun-m of image pixels by using a prism or grating to disperse the optical signal that is focused on the optical slit along each of the rows of the detector.

Figure 23:
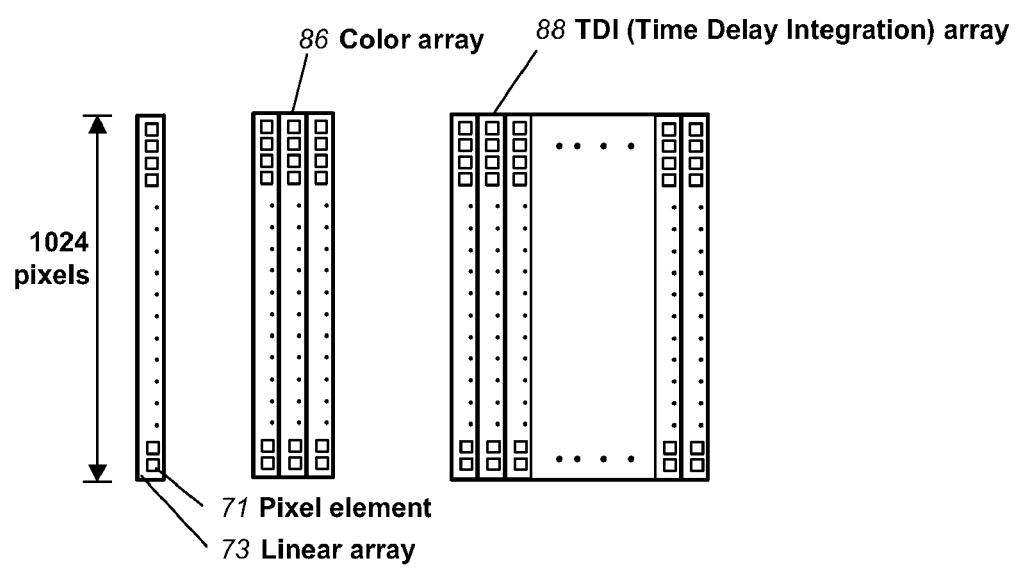
FIG. 23 illustrates a manner in which contiguous image strips acquired by a linear array detector digitizes a portion of a sample according to the present invention.

The capabilities of the line scan camera 18 typically determine whether scanning can be done bi-directionally, as in the currently preferred embodiment of the scanner 11, or uni-directionally. Uni-directional systems often comprise more than one linear array 73, such as a three channel color array 86 or a multi-channel IDI array 88 shown in FIG. 23. The color array 86 detects the RGB intensities required for obtaining a color image. An alternate embodiment for obtaining color information uses a prism to split the broadband optical signal into the three color channels. The IDI array 88 could be used in an alternate embodiment of the scanner 11 to provide a means of increasing the effective integration time of the line scan camera 18, while maintaining a fast data rate, and without significant loss in the signal-to-noise ratio of the digital imagery data.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods for data management in a linear-array-based microscope slide scanner herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for managing imagery data produced by a line scan camera, comprising:
receiving a first stripe of imagery data from a line scan camera and storing the first stripe in a buffer memory, the first stripe having a length and a width, the length being greater than the width, the first stripe having a first edge along the length and a second edge along the length;
copying a first plurality of image portions from the first stripe, each of said first plurality of image portions having an edge substantially near the first edge of the first stripe;
storing each of the first plurality of image portions as an image tile in a virtual slide image file;
receiving a second stripe of imagery data from a line scan camera and storing the second stripe in a buffer memory, the second stripe having a length and a width, the length being greater than the width, the second stripe having a first edge along the length and a second edge along the length, wherein the first edge of the second stripe overlaps the second edge of the first stripe to define a first overlap area;
aligning the second stripe with the first stripe;
copying a second plurality of image portions from the first stripe, each of said second plurality of image portions comprising a portion of imagery data from the first overlap area; and
storing each of the second plurality of image portions as an image tile in the virtual slide image file.

2. The method of claim 1, further comprising:
receiving a third stripe of imagery data from a line scan camera and storing the third stripe in a buffer memory, the third stripe having a length and a width, the length being greater than the width, the third stripe having a first edge along the length and a second edge along the length, wherein the first edge of the third stripe overlaps the second edge of the second stripe to define a second overlap area;
aligning the third stripe with the second stripe;
copying a third plurality of image portions from the second stripe, each of said third plurality of image portions having an edge adjacent to one of the second plurality of image portions;
and storing each of the third plurality of image portions from the second stripe as an image tile in the virtual slide image file.

3. The method of claim 2, further comprising:
copying a fourth plurality of image portions from the second stripe, each of said fourth plurality of image portions having an edge adjacent to one of the third plurality of image portions from the second stripe;
and storing each of the fourth plurality of image portions from the second stripe as an image tile in the virtual slide image file.

4. The method of claim 3, further comprising:
combining the first, second, third, and fourth plurality of image tiles into a baseline image in the virtual slide image file;
interpolating the baseline image to produce an intermediate level image having a resolution different from the baseline image;
copying a fifth plurality of image portions from the intermediate level image;
and storing each of the fifth plurality of image portions from the intermediate level image as an image tile in the virtual slide image file.

5. The method of claim 1, wherein said aligning the second stripe with the first stripe includes:
identifying a first subset of pixels from the first stripe in the first overlap area, said first subset of pixels defining an edge of an object;
identifying a second subset of pixels from the second stripe in the first overlap area, said second subset of pixels defining an edge of an object;
comparing pixel intensities between first subset of pixels from the first stripe and the second subset of pixels from the second stripe to identify matching pattern;
and aligning the second stripe with the first stripe based on one or more identified matching pattern.

6. The method of claim 5, wherein aligning the second stripe with the first stripe includes testing a range of stripe offset values determined by a mechanical motion uncertainties from stripe to stripe.

7. The method of claim 5, further comprising:
receiving alignment information for aligning the second stripe with the first stripe; and
storing the alignment information in a stripe offset file.

8. A system for managing imagery data produced by a line scan camera, comprising:
a first buffer memory configured to receive a first stripe of imagery data from a line scan camera, the first stripe having a length and a width, the length being greater than the width, the first stripe having a first edge along the length and a second edge along the length;
a second buffer memory configured to receive a second stripe of imagery data from a line scan camera, the second stripe having a length and a width, the length being greater than the width, the second stripe having a first edge along the length and a second edge along the length, wherein the first edge of the second stripe overlaps the second edge of the first stripe to define a first overlap area;
a processor configured to copy a first plurality of image portions from the first stripe, each of said first plurality of image portions having an edge substantially near the first edge of the first stripe, and store each of the first plurality of image portions as an image tile in a virtual slide image file, said processor further configured to align the second stripe with the first stripe, copy a second plurality of image portions from the first stripe, each of said second plurality of image portions comprising a portion of imagery data from the first overlap area, and to store each of the second plurality of image portions as an portion image tile in a virtual slide image file; and
a storage unit for storing the virtual slide image file.

9. The system of claim 8, wherein the processor is further configured to discard the imagery data in the first buffer memory after substantially all of the imagery data is copied into the virtual slide image file.

10. The system of claim 9, wherein in the first buffer memory is further configured to receive a third stripe of imagery data from a line scan camera, the third stripe having a length and a width, the length being greater than the width, the third stripe having a first edge along the length and a second edge along the length, wherein the first edge of the third stripe overlaps the second edge of the second stripe to define a second overlap area.

11. The system of claim 10, wherein the processor is further configured to align the third stripe with the second stripe and copy a third plurality of image portions from the second stripe, each of said third plurality of image portions having an edge adjacent to one of the second plurality of image portions from the first stripe, the processor further configured to store each of the third plurality of image portions from the second stripe as an image tile in the virtual slide image file.

12. A computer implemented method for managing imagery data produced by a microscope slide scanner including plurality of time delay integration (TDI) arrays that each comprise a plurality of light responsive elements arranged in a linear array and where each TDI array is positioned to receive an optical signal for one of a plurality of color channels, the method comprising:
receiving a first stripe of imagery data from the plurality of TDI arrays and storing the first stripe in a buffer memory;
copying a first plurality of image portions from the first stripe;
storing each of the first plurality of image portions as an image tile in a virtual slide image file;
receiving a second stripe of imagery data from the plurality of IDI arrays and storing the second stripe in a buffer memory, wherein an edge of the second stripe overlaps an edge of the first stripe to define a first overlap area;
aligning the second stripe with the first stripe;
copying a second plurality of image portions from the first stripe, each of said second plurality of image portions comprising a portion of imagery data from the first overlap area; and
storing each of the second plurality of image portions as an image tile in the virtual slide image file.

13. A system for managing imagery data produced by a microscope slide scanner including a plurality of time delay integration (TDI) arrays that each comprise a plurality of light responsive elements arranged in a linear array and where each TDI array is positioned to receive an optical signal for one of a plurality of color channels, the system comprising:
a first buffer memory configured to receive a first stripe of imagery data from the plurality of TDI arrays;
a second buffer memory configured to receive a second stripe of imagery data from the plurality of TDI arrays, wherein an edge of the second stripe overlaps an edge of the first stripe to define a first overlap area;
a processor configured to copy a first plurality of image portions from the first stripe and store each of the first plurality of image portions as an image tile in a virtual slide image file, said processor further configured to copy a second plurality of image portions from the first stripe and store each of the second plurality of image portions as an image tile in a virtual slide image file, where each of said second plurality of image portions comprises a portion of imagery data from the first overlap area; and
a storage unit for storing the virtual slide image file.

* * * * *

UNITED STATES PATENT AND TRADEMARK OFFICE
CERTIFICATE OF CORRECTION

| | | |
|---|---|---|
| PATENT NO. | : 7,428,324 B2 | Page 1 of 1 |
| APPLICATION NO. | : 11/379648 | |
| DATED | : September 23, 2008 | |
| INVENTOR(S) | : Greg J. Crandall et al. | |

It is certified that error appears in the above-identified patent and that said Letters Patent is hereby corrected as shown below:

Column 34:
Claim 12, line 16, delete "IDI" and insert --TDI--.

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,428,324 B2 | Page 1 of 1 |
| APPLICATION NO. | : 11/379648 | |
| DATED | : September 23, 2008 | |
| INVENTOR(S) | : Greg J. Crandall et al. | |

It is certified that error appears in the above-identified patent and that said Letters Patent is hereby corrected as shown below:

Claim 8, line 59, delete "portion".

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,428,324 B2  Page 1 of 1
APPLICATION NO.  : 11/379648
DATED            : September 23, 2008
INVENTOR(S)      : Greg J. Crandall et al.

It is certified that error appears in the above-identified patent and that said Letters Patent is hereby corrected as shown below:

Column 33, Claim 8, line 59, delete "portion".

This certificate supersedes the Certificate of Correction issued June 30, 2009.

Signed and Sealed this

Twenty-eighth Day of July, 2009

JOHN DOLL
*Acting Director of the United States Patent and Trademark Office*